(12) United States Patent
Miura et al.

(10) Patent No.: US 7,188,356 B1
(45) Date of Patent: Mar. 6, 2007

(54) SYSTEM FOR AND METHOD OF TRANSMITTING AND RECEIVING PROGRAM, CENTER DEVICE, AND TERMINAL DEVICE

(75) Inventors: Takeshi Miura, Tokyo-to (JP); Mitsuru Nishitsuka, Tokyo-to (JP); Nobuo Uee, Tokyo-to (JP); Akihiko Naito, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 705 days.

(21) Appl. No.: 09/714,510

(22) Filed: Nov. 17, 2000

(30) Foreign Application Priority Data

Nov. 17, 1999 (JP) .............................. P11-326576

(51) Int. Cl.
- *G06F 13/00* (2006.01)
- *G06F 3/00* (2006.01)
- *H04N 5/445* (2006.01)
- *H04N 7/173* (2006.01)

(52) U.S. Cl. .......................... 725/46; 725/40; 725/44; 725/45; 725/47; 725/61; 725/87; 725/91; 725/96; 725/97

(58) Field of Classification Search ................ 725/37, 725/39–40, 44–47, 61, 87, 91, 96–97
See application file for complete search history.

(56) References Cited

U.S. PATENT DOCUMENTS

| | | | | |
|---|---|---|---|---|
| 5,630,119 | A * | 5/1997 | Aristides et al. ............... | 707/1 |
| 5,751,282 | A * | 5/1998 | Girard et al. ............... | 715/721 |
| 5,920,700 | A * | 7/1999 | Gordon et al. ............... | 709/226 |
| 6,314,575 | B1 * | 11/2001 | Billock et al. ............... | 725/87 |
| 6,317,881 | B1 * | 11/2001 | Shah-Nazaroff et al. ...... | 725/46 |
| 6,378,036 | B2 * | 4/2002 | Lerman et al. ............. | 711/112 |
| 6,600,503 | B2 * | 7/2003 | Stautner et al. ............... | 725/40 |
| 6,704,931 | B1 * | 3/2004 | Schaffer et al. ............... | 725/46 |

(Continued)

FOREIGN PATENT DOCUMENTS

JP          09-018856 A          1/1997

(Continued)

*Primary Examiner*—John Miller
*Assistant Examiner*—Michael W. Hoye
(74) *Attorney, Agent, or Firm*—Sughrue Mion, PLLC

(57) ABSTRACT

A program transmitting/receiving system has a center device and a terminal device connected through a communication device to the center device. The center device has a program information memory, a program information transmitter, a broadcasting device, and a request program transmitter. The terminal device has a program information receiver, a program receiver, an image information generator, a program request signal transmitter, and a request program receiver. The memory stores a program information. The program information transmitter transmits the program information to the terminal device. The broadcasting device broadcasts the program to the terminal device in accordance with a schedule, and stores the program. The request program transmitter receives a request signal of the program from the terminal device, and transmits the program corresponding to the request signal to the terminal device. Then, the program information receiver receives the program information. The a program receiver receives the program. The image information generator generates an image information for a program selection of a user on the basis of the program information. The program request signal transmitter transmits the request signal of the program selected by the user to the center device, if the program selected in accordance with the image information is a past broadcast program. The request program receiver receives the program corresponding to the request signal.

23 Claims, 17 Drawing Sheets

U.S. PATENT DOCUMENTS 6,782,553 B1 * 8/2004 Ogawa et al. .............. 725/146

FOREIGN PATENT DOCUMENTS

| JP | 09-26109 A | 10/1997 |
| JP | 10-248050 A | 9/1998 |
| JP | 11-025541 A | 1/1999 |
| JP | 11-220667 A | 8/1999 |
| JP | 11-341371 A | 12/1999 |

* cited by examiner

FIG. 3

| No. | ITEM | Example of Data | Explanation |
|---|---|---|---|
| 1 | Program Identification Number (ID) | 12345 | |
| 2 | TITLE | The World Ancient Monument | |
| 3 | Broadcasting Date | 1999.10.12 | This item indicates predetermined one before the end of broadcasting, and indicates actual one after broadcasting. If it is different from the predetermined one, it is updated. |
| 4 | Start Time | 21:30 | ditto |
| 5 | Program Length | 120 minutes | ditto. This item can indicate End Time. |
| 6 | Broadcasting Channel | 48 CH | |
| 7 | | | |
| 8 | Genre | Travel | |
| 9 | Description | Introduce of the world ancient site | |
| 10 | Parental | G | This item indicates a code of viewing control. |
| 11 | Audio Mode | Bilingual | Stereo, Diphonia, etc., are other examples of this item. |
| 12 | Charge | 320 yen | This item is used in case of pay program. |
| 13 | Allowance or Rejection of Request | Allowance | Allowance—If the program is stored in server. Rejection—If the program is not stored in server. |
| 14 | Viewing Rate at the actual broadcasting | 15 % | If the program is viewed more than M (e.g. 5)minutes, it is regarded as a viewed program. Then a viewed flag is transmitted to a center at the end of broadcasting. Viewing rate is calculating on the basis of the flag. |
| 15 | Number of Request | 126 times | This item indicates the number of request after broadcasting. |
| 16 | Request Ranking | 35 | This item indicates the ranking in descending order of number of request. |
| 17 | Accumulation Schedule Period | 30 days | This indicates a period of storing program in server after broadcasting. |
| 18 | Presence or Absence of superimpose at the present broadcasting date | Presence | If the program is current-affairs one, such as news, a broadcasting date is superimposed to prevent a viewer from confusing. However, it is erasable by an operation of the viewer. |
| 19 | Period of Broadcasting and Number of shift in NVOD | 30 minutes<br>4 shift | If transmission is done by request in NVOD, for example, at 30-minute-interval in 2-hour-program, 4 shifts is needed. |
| 20 | Transmission CH of each shift and next START TIME in NVOD | 51 CH : 22:00<br>52 CH : 22:30<br>53 CH : 23:00<br>54 CH : 23:30 | |

22 — row 13
23 — row 17
24 — row 19

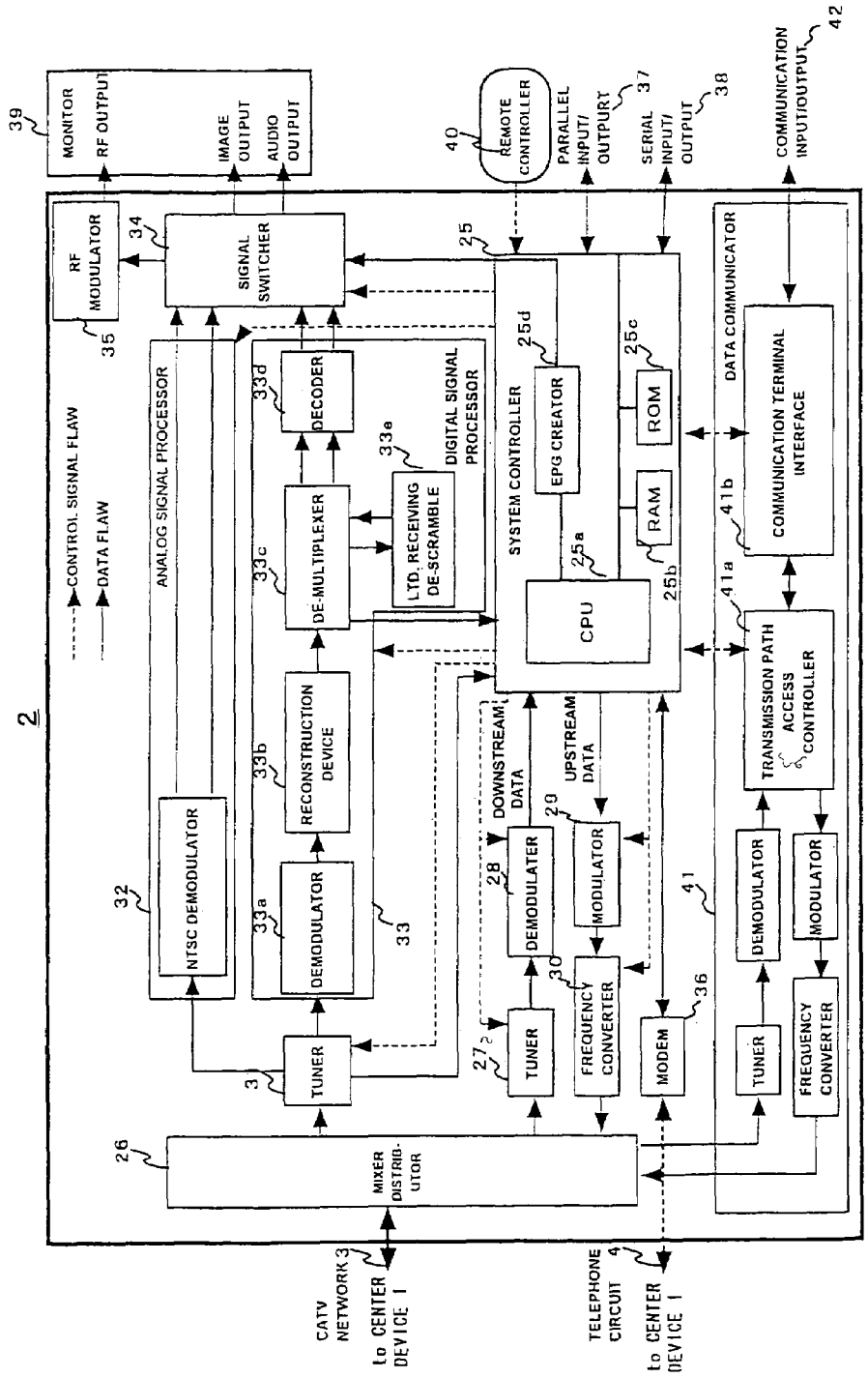

FIG. 8

| RANKING | TITLE | VIEWING RATE | BROADCASTING STATION | BROADCASTING DATE & TIME | GENRE |
|---|---|---|---|---|---|
| 1 | AAA | 23 % | TV TT | 1998/9/5 19:30- 21:30 | FOREIGN MOVIE |
| 2 | BBB | 22 % | LL TV | 1998/10/5 17:30- 21:30 | BASEBALL |
| 3 | CCC | 17 % | KKK BROADCASTING | 1985/1/5 19:30- 21:30 | VARIETY |
| 4 | DDD | 16 % | GCC TV | 1993/12/5 8:30- 9:30 | PROFESSIONAL WRESTLING |
| 5 | EEE | 15 % | ... | ... | ... |

FIG. 9
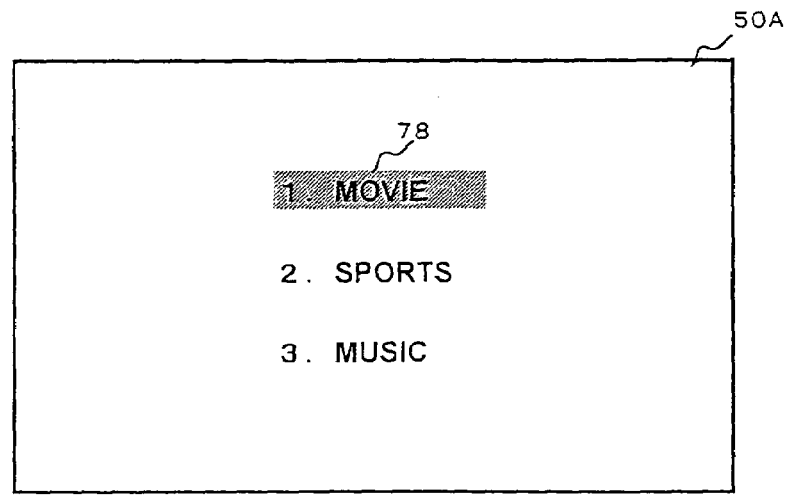
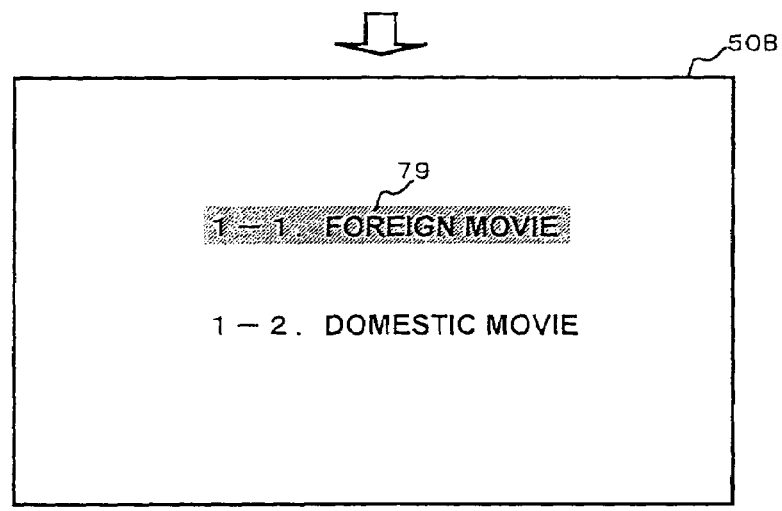
| No. | TITLE Alphabetic Order | Number of times | Broadcasting Station | Broadcasting Date |
|---|---|---|---|---|
| 1 | Easy...... | 534回 | ... | ... |
| 2 | Everest..... | 450回 | ... | ... |
| 3 | OK...... | 135回 | ... | ... |
| 4 | To Tomorrow..... | 241回 | ... | ... |
| 5 | Western...... | 1352回 | ... | ... |

SYSTEM FOR AND METHOD OF TRANSMITTING AND RECEIVING PROGRAM, CENTER DEVICE, AND TERMINAL DEVICE

BACKGROUND OF THE INVENTION

1. Field of the Invention

The present invention relates to a program transmission system used for, for example, a CATV (Community Antenna Television or Cable Television) system and the like, and more particularly relates to a system for transmitting a program, in accordance with a request from a viewer.

2. Description of the Related Art

A CATV has been known as a system for mainly transmitting a TV signal through a cable. A center device in this CATV broadcasts a sustaining program, a re-transmission (not equal to a so-called re-broadcast) of a broadcast program received from another broadcasting station, or a program already stored in a memory medium (a movie and the like). Those programs are broadcast in accordance with a broadcast schedule. The re-transmission implies that a program received from another broadcasting station is broadcast in its original state although a channel conversion may be carried out. On the other hand, the re-broadcast implies that a part of the program (mainly, a popular program) broadcast in accordance with the broadcast schedule is again added into the broadcast schedule and broadcast.

The broadcast schedule in the CATV specifies a broadcast channel of each program, a broadcast start time, a length of a program or a broadcast end time and the like, similarly to that of a typical television station or the like.

A viewer can know a desirable program by using a television program table announcing the schedule on a newspaper, a magazine and the like, or a recently popularized EPG (Electronic Program Guide).

A program currently being broadcast or a future program can be selected by using this EPG. In a case of the program currently being broadcast, it is possible to immediately receive the broadcast channel. In a case of the future program, it is possible to store a broadcast channel of the program, a broadcast start time, a length of the program or a broadcast end time, and the like. The broadcast channel of the program is received at the broadcast time of the program. The program received at this time can be automatically stored by controlling a connected VTR.

The CATV broadcast has been digitized so that it becomes easier to make a data reception such as a schedule information and the like, or transmit a terminal information to a center device.

On the other hand, VOD (Video On Demand) or NVOD (Near Video On Demand) has been known as a service type to give a program to a viewer. In brief, after a reception of a request from the viewer, a program is broadcast to the viewer at least requesting the program in the VOD. In a case of the NVOD, irrespective of a presence or absence of the request from the viewer, the same program is repeatedly broadcast to an indefinite number of viewers in a normal case, through a plurality of channels, while the broadcast time is shifted. In short, in the case of the NVOD, the program is transmitted in accordance with a schedule. It is possible to select a suitable channel in the EPG. This is used, for example, in a picture library in which a visitor to a library, a museum or the like can request a desirable picture from a terminal to thereby view the picture stored in a database in advance.

However, in the conventional program view system, the already broadcast program is not displayed in the EPG. Even if it is displayed, the viewer can not select it. That is, there is no system in which the viewer can view a past program broadcast in accordance with a schedule. Thus, if the viewer forgets to set (reserve) a recording of program desired by the viewer, or if the viewer is aware of the program desired by the viewer after the program is broadcast, the viewer can not view the program.

SUMMARY OF THE INVENTION

The present invention is proposed in view of the above mentioned problems. It is therefore an object of the present invention to provide a system and a method in which a viewer can view even a past program broadcast in accordance with a schedule and further view it by using an easy simple operation.

The above object of the present invention can be achieved by a program transmitting/receiving system. The system has a center device and at least one terminal device connected through a communication device to the center device. The center device is provided with: a program information memory device for storing an information with regard to a program generated on the basis of a schedule to broadcast a program; a program information transmitting device for transmitting the information with regard to the program to the terminal device through the communication device; a broadcasting device for broadcasting the program to the terminal device through the communication device, in accordance with the schedule, and for storing the program therein at a transferable condition to the terminal device; and a request program transmitting device for receiving a request signal of the program transmitted by the terminal device, and for transmitting the program, corresponding to the request signal of the program and stored at the transferable condition, through the communication device to the terminal device at least transmitting the request signal of the program. The terminal device is provided with: a program information receiving device for receiving the information with regard to the program transmitted by the center device; a program receiving device for receiving the program broadcast by the center device; an image information generating device for generating an image information for a program selection of a user, on the basis of the information with regard to the program; a program request signal transmitting device for transmitting the request signal of the program selected by the user to the center device through the communication device, if the program selected by the user in accordance with the image information is a past program broadcast in accordance with the schedule from the center device; and a request program receiving device for receiving the program corresponding to the request signal of the program transmitted by the center device.

According to the program transmitting/receiving system of the present invention, the program information transmitting device of the center device transmits the information with regard to the program to the terminal device through the communication device. The broadcasting device of the center device broadcasts the program to the terminal device through the communication device, in accordance with the schedule, and stores the program therein at a transferable condition to the terminal device. The program receiving device of the terminal device receives the program broadcast by the center device. The program information receiving device of the terminal device receives the information with regard to the program transmitted by the center device, and an image information generating device of the terminal device generates an image information for a program selection of a user, on the basis of the information with regard to the program. Then if the user selects a desirable program on the basis of the image information and the program selected by the user in accordance with the image information is a past program broadcast in accordance with the schedule from the center device, the program request signal transmitting device of the terminal device transmits the request signal of the program selected by the user to the center device through the communication device. Then the request program transmitting device of the center device receives the request signal of the program transmitted by the terminal device, and transmits the program, corresponding to the request signal of the program and stored at the transferable condition, through the communication device to the terminal device at least transmitting the request signal of the program. Then the request program receiving device of the terminal device receives the program corresponding to the request signal of the program transmitted by the center device.

Therefore, even past program broadcast in accordance with the program broadcasting schedule can be automatically transmitted from the center device to the terminal device in accordance with the request of the user. Consequently, the user can easily view the program broadcast in accordance with the program broadcasting schedule if the user forget to view the program or to program for recording the program (to set recording reservation).

In one aspect of the program transmitting/receiving system of the present invention, the information with regard to the program includes information indicating allowance or rejection of transmitting the program. Further, the terminal device has a viewing information transmitting device. The viewing information transmitting device transmits viewing information with regard to the program received by the program receiving device or the request program receiving device through the communication device to the center device. Furthermore, the center device has a transmission allowance selecting device, a program erasing device, and a selection updating device. The transmission allowance selecting device receives the viewing information and selects allowance or rejection of transmitting the program on the basis of the viewing information. The program erasing device erases the program stored by program information memory device on the basis of the selection of allowance or the rejection of transmitting. The selection updating device updates information indicating the selection of allowance or the rejection of transmitting on the basis of the selection of allowance or the rejection of transmitting.

According to this aspect, the program stored by the program information memory at a transferable condition to the terminal device can be erased on the basis of the selection of allowance or the rejection of transmitting. Consequently, an increase of a capacity of a storage medium storing the already broadcast program can be reduced. In addition, a cost with the increase of the capacity can be reduced.

In another aspect of the program transmitting/receiving system of the present invention, the information with regard to the program includes the viewing information, and the image information for the program selection of a user includes a display on the basis of the viewing information.

According to this aspect, the information with regard to the program can be transmitted to each terminal device, so that the viewing information can be recognized in each terminal device. In addition, a user can request a program with reference to the viewing information.

In another aspect of the program transmitting/receiving system of the present invention, the information with regard to the program includes information with regard to viewing frequency or request frequency. Further, the center device is provided with: a calculating device for totaling the viewing information or the request signal of the program and calculating the viewing frequency or the request frequency per program; and a frequency updating device for updating the viewing frequency or the request frequency on the basis of the calculated viewing frequency or calculated request frequency. Furthermore, the transmission allowance selecting device selects allowance or rejection of transmitting the program on the basis of the viewing frequency or the request frequency.

According to this aspect, the program stored by the program information memory at a transferable condition to the terminal device can be erased on the basis of the calculated viewing frequency or the calculated request frequency. Therefore, an increase of a capacity of a storage medium storing the already broadcast program can be reduced. In addition, a cost with the increase of the capacity can be reduced.

In another aspect of the program transmitting/receiving system of the present invention, the program request signal transmitting device transmits the request signal of the program through the communication device to the center device on the basis of the information indicating allowance or rejection of transmitting the program, included in the information with regard to the program and transmitted by the center device.

According to this aspect, information indicating allowance or rejection of the request can be referred in the terminal device, so that a user can immediately recognize whether the broadcast program can be requested.

In another aspect of the program transmitting/receiving system of the present invention, the center device updates the information with regard to the program on the basis of a fact that the program is broadcast by the center device.

According to this aspect, the information with regard to the program can be updated on the basis of a fact of broadcasting, such as a special newscast, change of a program, an extension of a program, etc., so that a user can recognize an object program for request.

The above object of the present invention can be achieved by a center device to which at least one terminal device is connected through a communication device. The center device has a program information memory device, a program information transmitting device, a broadcasting device, and a request program transmitting device. the program information memory device stores an information with regard to a program generated in accordance with a schedule to broadcast a program. The program information transmitting device transmits the information with regard to the program through the communication device to the terminal device. The broadcasting device broadcasts the program through the communication device to the terminal device, in accordance with the schedule, and stores the program therein at a transferable condition to the terminal device. The request program transmitting device receives a request signal of the program transmitted by the terminal device, and transmits the program, corresponding to the request signal of the program and stored at the transferable condition, through the communication device to the terminal device at least transmitting the request signal of the program.

According to the center device of the present invention, the center device stores the past program broadcast in accordance with the program broadcasting schedule whenever necessary, and can automatically transmit the program corresponding to the request of the user to the terminal device.

The above object of the present invention can be achieved by a terminal device connected to a center device having a program and information with regard to the program through a communication device. The terminal device has a program information receiving device, a program receiving device, an image information generating device, a program request signal transmitting device, and a request program receiving device. The program information receiving device receives a information with regard to the program transmitted by the center device. The program receiving device receives the program broadcast by the center device. The image information generating device generates an image information for a program selection of a user, in accordance with the information with regard to the program. The program request signal transmitting device transmits the request signal of the program selected by the user through the communication device to the center device, if the program selected by the user in accordance with the image information is a past program broadcast in accordance with the schedule from the center device. The request program receiving device receives the program corresponding to the request signal of the program transmitted by the center device.

According to the terminal device of the present invention, a user can easily view the program broadcast in accordance with the program broadcasting schedule if the user forget to view the program or to program for recording the program (to set recording reservation).

The above object of the present invention can be achieved by a program broadcasting method in a program transmitting/receiving system having a center device and at least one terminal device connected through a communication device to the center device. The program broadcasting method is provided with the processes as follows: the process of storing an information with regard to a program generated on the basis of a schedule to broadcast a program in the center device; The process of transmitting the information with regard to the program through the communication device from the center device to the terminal device; The process of broadcasting the program through the communication device from the center device to the terminal device, in accordance with the schedule; The process of storing the program in the center device at a transferable condition to the terminal device; The process of receiving the information with regard to the program transmitted by the center device, in the terminal device; The process of generating an image information for a program selection of a user, on the basis of the information with regard to the program in the terminal device; The process of transmitting a request signal of the program selected by the user through the communication device from the terminal to the center device, if the program selected by the user on the basis of the image information is a past program broadcast in accordance with the schedule from the center device; The process of receiving the request signal of the program transmitted by the terminal device, in the center device; The process of transmitting the transferable program corresponding to the request signal of the program through the communication device from the center device to the terminal device at least transmitting the request signal of the program; and the process of receiving the program corresponding to the request signal of the program transmitted by the center device, in the terminal device.

According to the program broadcasting method of the present invention, the information with regard to the program is transmitted from the center device to the terminal device through the communication device. The program is broadcast from the center device to the terminal device through the communication device, in accordance with the schedule, and stored therein at a transferable condition to the terminal device. The program broadcast by the center device is received by the terminal device. The information with regard to the program transmitted by the center is received by the terminal device. The image information for a program selection of a user is generated, on the basis of the information with regard to the program. Then if the user selects a desirable program on the basis of the image information and the program selected by the user in accordance with the image information is a past program broadcast in accordance with the schedule from the center device, the request signal of the program selected by the user is transmitted from the terminal device to the center device through the communication device. Then the request signal of the program transmitted by the terminal device is received by the center device, and the program, corresponding to the request signal of the program and stored at the transferable condition, is transmitted through the communication device to the terminal device at least transmitting the request signal of the program. Then the program corresponding to the request signal of the program transmitted by the center device is received by the terminal device.

Therefore, even past program broadcast in accordance with the program broadcasting schedule can be automatically transmitted from the center device to the terminal device in accordance with the request of the user. Consequently, the user can easily view the program broadcast in accordance with the program broadcasting schedule if the user forget to view the program or to program for recording the program (to set recording reservation).

In another aspect of the program broadcasting method of the present invention, the information with regard to the program includes information indicating allowance or rejection of transmitting the program, and the program broadcasting method is further provided with the process of transmitting viewing information with regard to the program received through the communication device from the terminal device to the center device; the process of receiving the viewing information in the center device; the process of selecting allowance or rejection of transmitting the program on the basis of the viewing information in the center device; the process of erasing the program stored in the center device on the basis of the selection of allowance or the rejection of transmitting; and the process of updating information indicating the selection of allowance or the rejection of transmitting on the basis of the selection of allowance or the rejection of transmitting in the center device.

According to this aspect, the program stored by the program information memory at a transferable condition to the terminal device can be erased on the basis of the selection of allowance or the rejection of transmitting. Consequently, an increase of a capacity of a storage medium storing the already broadcast program can be reduced. In addition, a cost with the increase of the capacity can be reduced.

In another aspect of the program broadcasting method of the present invention, the information with regard to the program includes the viewing information, and the image information for the program selection of a user includes a display on the basis of the viewing information.

According to this aspect, the information with regard to the program can be transmitted to each terminal device, so that the viewing information can be recognized in each terminal device. In addition, a user can request a program with reference to the viewing information.

In another aspect of the program broadcasting method of the present invention, the information with regard to the program includes information with regard to viewing frequency or request frequency, and the program broadcasting method is further provided with: the process of totaling the viewing information or the request signal of the program; the process of calculating the viewing frequency or the request frequency per program; the process of updating the viewing frequency or the request frequency on the basis of the calculated viewing frequency or calculated request frequency; and the process of selecting allowance or rejection of transmitting the program on the basis of the viewing frequency or the request frequency.

According to this aspect, the program stored by the program information memory at a transferable condition to the terminal device can be erased on the basis of the calculated viewing frequency or the calculated request frequency. Therefore, an increase of a capacity of a storage medium storing the already broadcast program can be reduced. In addition, a cost with the increase of the capacity can be reduced.

In another aspect of the program broadcasting method of the present invention, the method is further provided with the process of transmitting the request signal of the program through the communication device to the center device on the basis of the information indicating allowance or rejection of transmitting the program, included in the information with regard to the program and transmitted by the center device.

According to this aspect, information indicating allowance or rejection of the request can be referred in the terminal device, so that a user can immediately recognize whether the broadcast program can be requested.

In another aspect of the program broadcasting method of the present invention, the method is further provided with the process of updating the information with regard to the program on the basis of a fact that the program is broadcast by the center device.

According to this aspect, the information with regard to the program can be updated on the basis of a fact of broadcasting, such as a special newscast, change of a program, an extension of a program, etc., so that a user can recognize an object program for request.

BRIEF DESCRIPTION OF THE DRAWINGS

FIG. 3 is a chart showing EPG data generated by the center device according to the embodiment of the present invention;

FIG. 4 is a block diagram showing function blocks generated of a terminal device according to the embodiment of the present invention;

FIG. 8 is a front view showing a past popular list screen of EPG according to the embodiment of the present invention;

FIG. 9 are front views showing a past search list screen EPG according to the embodiment of the present invention;

DESCRIPTION OF THE PREFERRED EMBODIMENT

The present invention is characterized in that a viewer can view even a past program broadcast in accordance with a schedule and also view it by using an easy simple operation.

A preferred embodiment of the present invention will be explained below with reference to the drawings.

Figure 1:
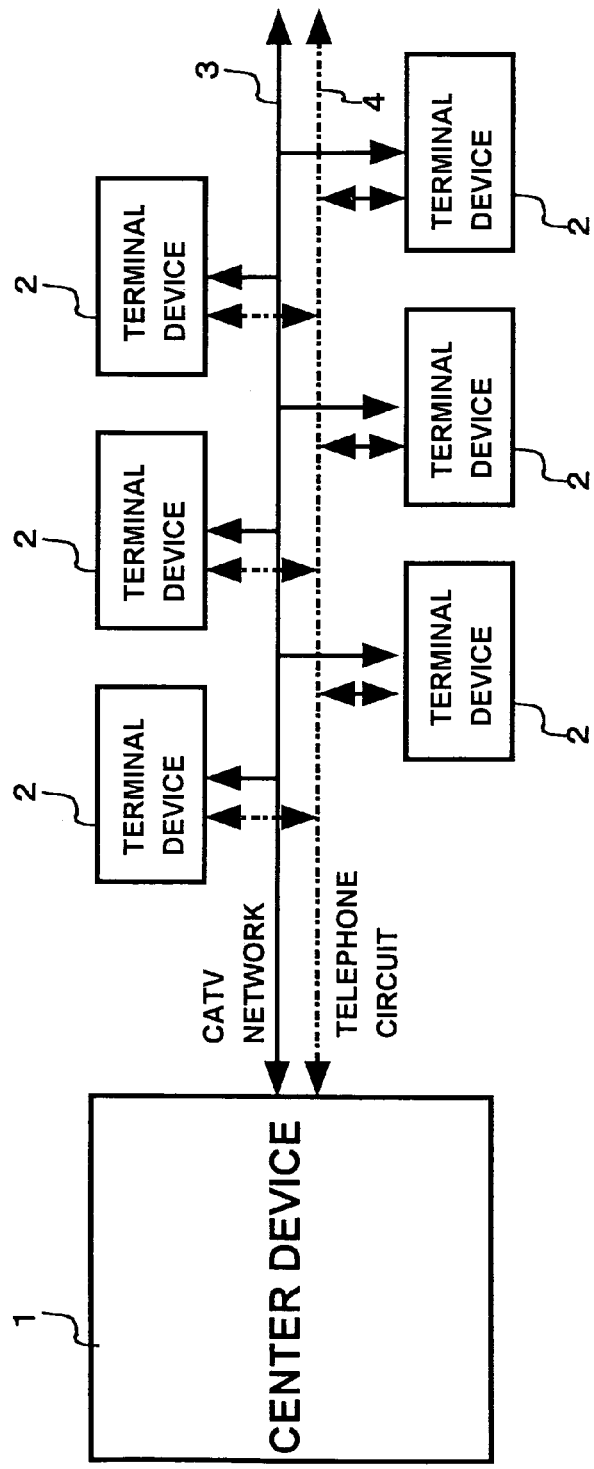
FIG. 1 is a block diagram showing a configuration of a system for transmitting and receiving a program, according to an embodiment of the present invention.

FIG. 1 shows the schematic configuration of a program transmitting/receiving system 100 according to the present invention.

As shown in FIG. 1, the program transmitting/receiving system 100 is roughly provided with a center device 1 and a plurality of terminal devices 2. Also, the center device 1 and each of the terminal devices 2 are connected to each other through a communication device. In this embodiment, the communication device is designed as a CATV network 3 comprised of wire cables so that a two-way data communication can be performed between the center device 1 and each of the terminal devices 2. Also, the center device 1 and each of the terminal devices 2 are connected to each other through a telephone circuit serving as a communication device 4.

Each members of the program transmission and reception system 100 will be described below.

Figure 2:
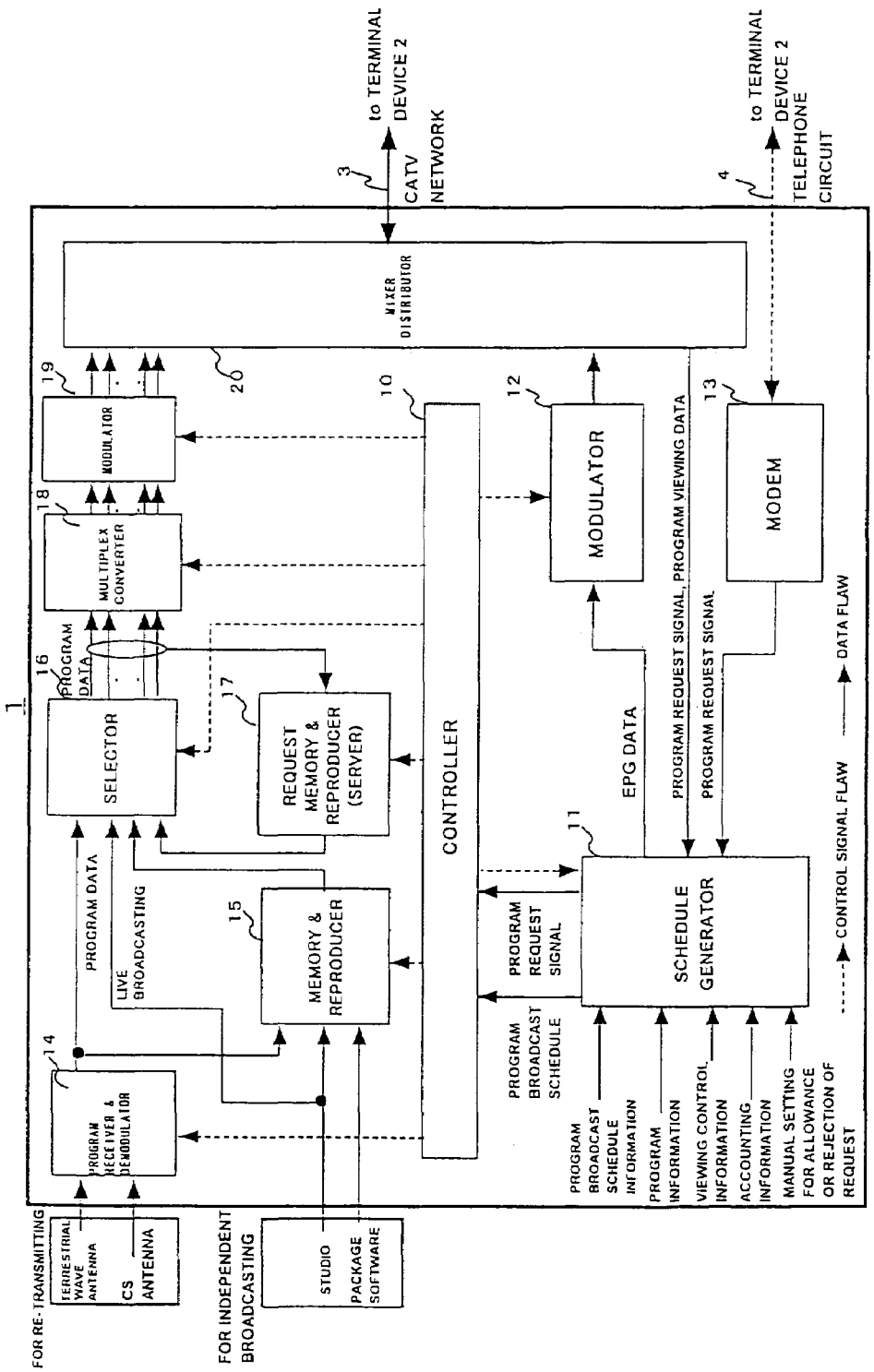
FIG. 2 is a block diagram showing function blocks of a center device according to the embodiment of the present invention.

FIG. 2 shows a block diagram showing function blocks of the center device 1 according to this embodiment.

As shown in FIG. 2, the center device 1 is provided with a controller 10, a schedule generator 11, a modulator 12, a modem 13, a program receiver and demodulator 14, a memory and reproducer 15, a selector 16, a request memory and reproducer 17, a multiplex converter 18, a modulator 19, and a mixer distributor 20.

The controller 10 is a multiple processing unit which is mainly comprised of CPU, and performs an entire control on the center device 1. Also, the controller 10 performs a control to broadcast a program to each terminal device 2 in accordance with a program broadcast schedule generated by the schedule generator 11. Further, the controller 10 performs a control to store data of a broadcast program in the request memory and reproducer 17, reproduce it, erase it, and do other operations.

The schedule generator 11 generates information with regard to a program (hereinafter, referred to as EPG data) for each program, as shown in FIG. 3, in accordance with a program broadcast schedule information entered by an operation of an operator or information of the program itself such as the contents of the program or the like. Also, the schedule generator 11 has a memory area to store the EPG data and other various data. Those data are read out and processed as necessary. The EPG data is always generated for a broadcast schedule program in future and accumulated. Also, such EPG data is modulated by the modulator 12 and transmitted through the mixer distributor 20 and the CATV network 3 to the terminal device 2.

The schedule generator 11 generates a program broadcast schedule in accordance with the EPG data. This program broadcast schedule is a schedule (plan) table of a program to be broadcast by the center device 1. A broadcast of a program to each terminal device 2 is carried out in accordance with the program broadcast schedule.

The schedule generator 11 receives a program request signal transmitted by each terminal device 2, and outputs to the controller 10. This program request signal is a signal to require the transmission of an already broadcast program in accordance with the program broadcast schedule. The program request signal can be received through the CATV network 3 from each terminal device 2. In addition, it can be also received from the telephone line 4.

Moreover, the schedule generator 11 sums up program view data and the program request signals transmitted from the terminal devices 2, after the broadcast. In accordance with those information, the schedule generator 11 calculates a viewing rate, the number of request, a request ranking and the like which are shown in FIG. 3, for each program, and updates the EPG data. Also, the schedule generator 11 updates the EPG data in accordance with a broadcast fact at a time of the broadcast. For example, when broadcasting of a special news, changing of a program, or extension of a broadcast period is performed, the schedule generator 11 corrects information of a target item of the EPG data. Also, the updated EPG data is transmitted through the CATV network 3 to the terminal device 2. The transmission of the updated EPG data to the terminal device 2 may be performed periodically or cyclically or at a real time. In a case of the real time, it is sequentially transmitted to the terminal device 2 for each update. In addition, it may be designed such that the newest EPG data is obtained each time a user uses and views an EPG screen.

The program receiver and demodulator 14 receives and demodulates a program broadcast by each broadcasting station, such as a commercial broadcasting station and the like. If the program is originally a compressed digital data in a form of packet, it may be designed such that the program receiver and demodulator 14 does not demodulate the program. Originally, such a broadcast is directly received by each home. However, in the embodiment, the center device 1 receives the broadcast program in order to re-transmit it.

The memory and reproducer 15 stores the program which is received by the program receiver and demodulator 14 and broadcast by each broadcasting station, such as the commercial broadcasting station and the like, the program which is recorded in the commercial broadcasting station, and a movie, a suspending program or the like in a form of stored package software. Also, a program data stored in the memory and reproducer 15 is reproduced in accordance with a command from the controller 10, namely, in accordance with the program broadcast schedule.

The selector 16 assigns the program reproduced by the memory and reproducer 15 to each channel. Thus, a plurality of programs corresponding to the number of channels are simultaneously outputted by the selector 16.

The request memory and reproducer (server) 17 is used for enabling a request broadcast of an already broadcast program according to the present invention. All program data outputted by the selector 16 are stored in the request memory and reproducer 17, for example, in a hard disc, an optical disc, a semiconductor memory and the like so that they can be read out from the plurality of terminal devices 2 at the same time and at any time. Thus, all the programs broadcast by the center device 1 are stored in the request memory and reproducer 17. Reading out all the program data at any time implies that such program data can be instantly outputted in accordance with the command from the controller 10, even in a case of a program in which a reading operation is not still finished. It may be designed such that a program which is target for memorizing is determined in advance and then only the program data is stored. Also, depending on a program, a program data stored in advance in the memory and reproducer 15 for a broadcast is diverted for a request.

Also, the program data stored in the request memory and reproducer 17 is reproduced at any time, in accordance with the command from the controller 10, namely, in accordance with the program request signal.

The program data stored in the request memory and reproducer 17 is erased in accordance with information of a request allowance or rejection on the EPG data. That is, with regard to a program in which data of an item of the request allowance or rejection denoted by a numeral 22 shown in FIG. 3 indicates "rejection", the program data is automatically erased. If the data of the item 22 of the request allowance or rejection is set at "rejection" in a program before the program is broadcast, the program is not stored at a time of the broadcast. The item 22 of request allowance or rejection for each program can be arbitrarily set by the operator in the schedule generator 11, or automatically set in accordance with the view rate, the number of requests and the like. For example, the items 22 of request allowance or rejection for all programs can be set at "allowance". Then each item 22 of request allowance or rejection for all programs can be set at "rejection" in the order of increasing the number of requests in accordance with a daily request result. If the program stored in the request memory and reproducer 17 is erased by using those ways, it is possible to effectively reduce an increase in an amount of data stored on the request memory and reproducer 17. The item 22 of request allowance or rejection for each program may be determined in accordance with the intent of a producer of each program or a nature of each program (for example, the item 22 for a program having a high feature as a news can be set at "rejection").

Moreover, a period in which a program data is accumulated in the request memory and reproducer 17 can be also set by setting an accumulation schedule period denoted by a numeral 23 shown in FIG. 3. Thus, the program data is automatically erased after an elapse of the accumulation schedule period.

The multiplex converter 18 multiplexes a plurality of program data outputted by the selector 16 in accordance with a multiplex compression method based on, for example, MPEG (Moving Picture Experts Group) 2 or the like, and generates a compressed digital data (transport stream) in a form of packet. Thus, it is possible to time division multiplex data corresponding to four programs in time sharing and then transmit to the terminal device 2. The transport stream implies a transmission bit stream defined by MPEG 2, and all data with regard to images, voices and others are formed into a packet having a fixed length, and then transmitted.

If the program received by the program receiver and demodulator 14 is originally the compressed digital data in the form of packet, the packets for a necessary program may be extracted to be re-multiplexed. Once it is demodulated to an analog image signal of a base band, it is used as the compressed digital data which is multiplexed.

The modulator 19 modulates the compressed digital data, outputted by the multiplex converter 18, by using a digital modulating method, for example, such as 64 QAM (64 Quadrature Amplitude Modulation) or the like, to obtain a high frequency signal having a predetermined carrier frequency of 6 MHz band.

The mixer distributor 20 mixes each signal including the data, such as the EPG data, the compressed digital data and the like, which is outputted by the modulators 12 and the modulator 19, and then outputs it to the CATV network 3. Also, the mixer distributor 20 receives the program request signal and the program view data which are transmitted by the terminal device 2 through the CATV network 3, and distributes them to each memory area of the schedule generator 11. It may be designed such that the mixer distributor 20 outputs the broadcast program to the CATV network 3 as an NTSC (National Television System Committee) signal, namely, an analog television signal conventionally used as a standard broadcast method.

The controller 10 of the center device 1 may transmit a program to be broadcast in accordance with the program request signal, only to a terminal device 2 transmitting the request signal, or may transmit to all terminal devices 2 connected to the center device 1, namely, terminal devices 2 which do not transmit the program request signal. It is possible for the operator of the center device 1 to arbitrarily determine which method is used to transmit it between the two methods.

Specifically, if the program is transmitted to only the terminal device 2 transmitting the request, a two-way data communication channel is used, and an address of the terminal device 2 is used as a destination. Then, the program data of the requested program is transmitted in a one-to-one relationship, for example, in a form of browsing animation of a web site on the Internet.

Also, there is the following method. That is, the program data is transmitted as a broadcast at an exclusive channel assigned to a request among ordinary image channels used for a broadcast from the terminal device 2 to the center device 1. Then, de-scramble key data to enable the terminal device 2 to demodulate the program data or the allowance data and the data of a channel to enable the terminal device 2 to reproduce the program requested by the terminal device 2 are transmitted in a two-way data communication channel by using an address of the terminal device 2 as a destination, so that the only terminal device 2 transmitting the request can demodulate the program data or the like. The data to be transmitted to the terminal device 2, if the request is done through the telephone line 4, may be transmitted within its call.

The data such as the EPG data transmitted from the center device 1 to the terminal device 2 and the like are defined as a downstream data (descending data). On the other hand, the data such as the program request data and the program view data which are transmitted from the terminal device 2 to the center device 1 and the like are defined an upstream data (ascending data). They are discriminated in this way.

FIG. 4 shows a block diagram showing functions of the terminal device 2 according to this embodiment.

As shown in FIG. 4, the terminal device 2 includes a system controller 25, a mixer distributor 26, a tuner 27, a demodulator 29, a frequency converter 30, a tuner 31, an analog signal processor 32, a digital signal processor 33, a signal switcher 34, an RF (high frequency) modulator 35 and a modem 36.

The system controller 25 is a multiple processing unit which is mainly comprised of a CPU 25$a$, and the system controller 25 performs the entire control of the terminal device 2. Specifically, it performs the initializations and the operational controls of members in the terminal device 2, the outputs of image and audio of the program data received by the terminal device 2 to a monitor 39, the creation of an EPG screen, the display of the EPG screen on the monitor 39, and the data communication to a remote controller 40. The system controller 25 also includes a RAM 25$b$ for temporarily storing the data such as the EPG data, the program view data and the like, a ROM 25$c$ for storing OS (Operating System) as a program necessary for the entirely operational control of the terminal device 2 and the data necessary for the execution of OS, and an EPG creator 25$d$ for creating the EPG screen.

As mentioned above, the EPG data is transmitted from the center device 1 through the CATV network 3, as the downstream data. An RF signal including the data of the transmitted EPG data is distributed to the tuner 27 by the mixer distributor 26. It is converted into a frequency suitable for a demodulation by the tuner 27, and demodulated as a digital data by the demodulator 28, and then stored in the RAM 25$b$. Also, the system controller 25 has a clock and calendar function. The RAM 25$b$ accumulates the EPG data of a period between one week before a present day and one week after the present day, namely, the EPG data corresponding to 15 days. If the EPG data is transmitted to the center device 1 for each request, it is not necessary to accumulate the EPG data corresponding to the 15 days. The clock and the calendar are sequentially corrected in accordance with a time information which is periodically transmitted as the downstream data from the center device 1.

The program view data stored in the RAM 25$b$ is the information such as the program viewed by the terminal device 2, the view time and the like. Those data are modulated by the modulator 29 periodically or in a real time, and converted into an RF signal of a frequency band for the upstream data transmission by the frequency converter 30, and then transmitted through the mixer distributor 26 and the CATV network 3 to the center device 1 as the upstream data. The program view data is the information with regard to a program. It includes all elements which can be recognized by the terminal device 2. For example, it includes information of a programming for recording (information of recording reservation) with regard to a program programmed for recording (reserved for recording).

The EPG creator 25*d* creates data of an EPG screen in accordance with the EPG data stored in the RAM 25*b*. The created data of the EPG screen is outputted through the signal switcher 34 to the monitor 39. The monitor 39 has a function of audio output. It may be designed such that the monitor 39 is mounted in the terminal device 2.

FIGS. 5 to 9 show examples of an EPG screen 50 displayed on the monitor 39. The viewer, while viewing the EPG screen 50 displayed on the monitor 39, operates the remote controller 40 shown in FIG. 10 to select a program or the like.

Figure 10:
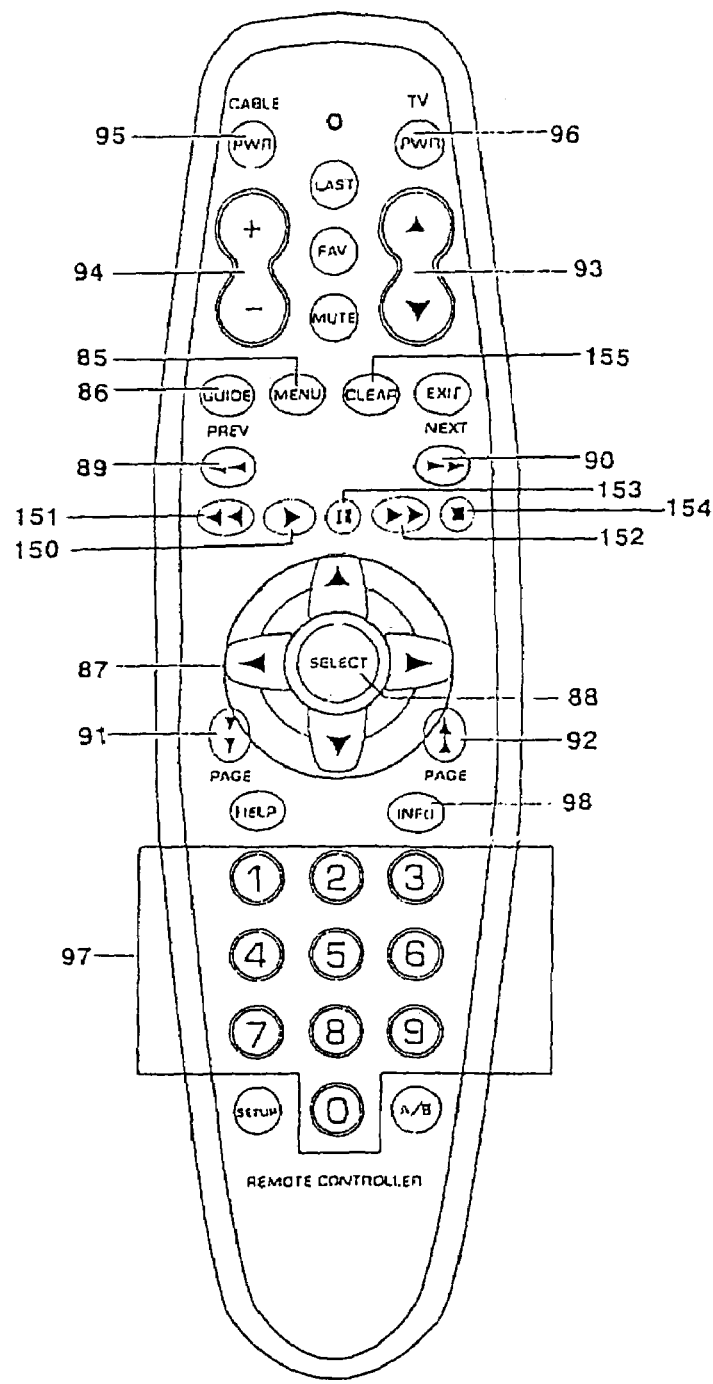
FIG. 10 is a plane view showing a key arrangement of a remote controller according to the embodiment of the present invention.

As shown in FIG. 10, various keys are assigned on the remote controller 40. If the viewer presses down each of the various keys, a control signal corresponding to the pressed key is transmitted by a wireless communication device (for example, an infrared ray device) to the system controller 25. Accordingly, the CPU 25*a* of the system controller 25 switches a content of the EPG screen 50, or selects and determines a broadcast program or the like.

Figure 5:
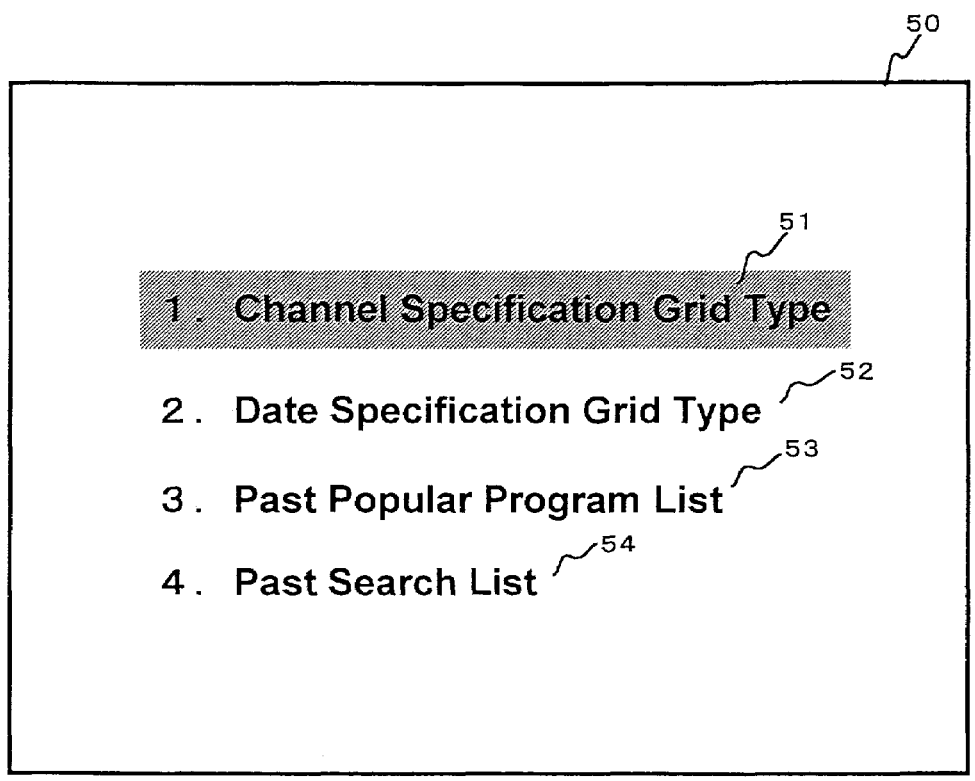
FIG. 5 is a front view showing a menu screen of EPG according to the embodiment of the present invention.

Specifically, a MENU key 85 is a key to indicate a menu screen as shown in FIG. 5. A GUIDE key 86 is a key to indicate a screen displayed immediately before an EPG screen currently being displayed. In FIG. 5, an item "Channel Specification Grid Type" 51 is highlighted (displayed to differentiate the display type of the item from that of the other items so that a viewer visually discriminates the display of one item from that of the other items). The highlighted item is an item currently being selected.

Figure 6A:
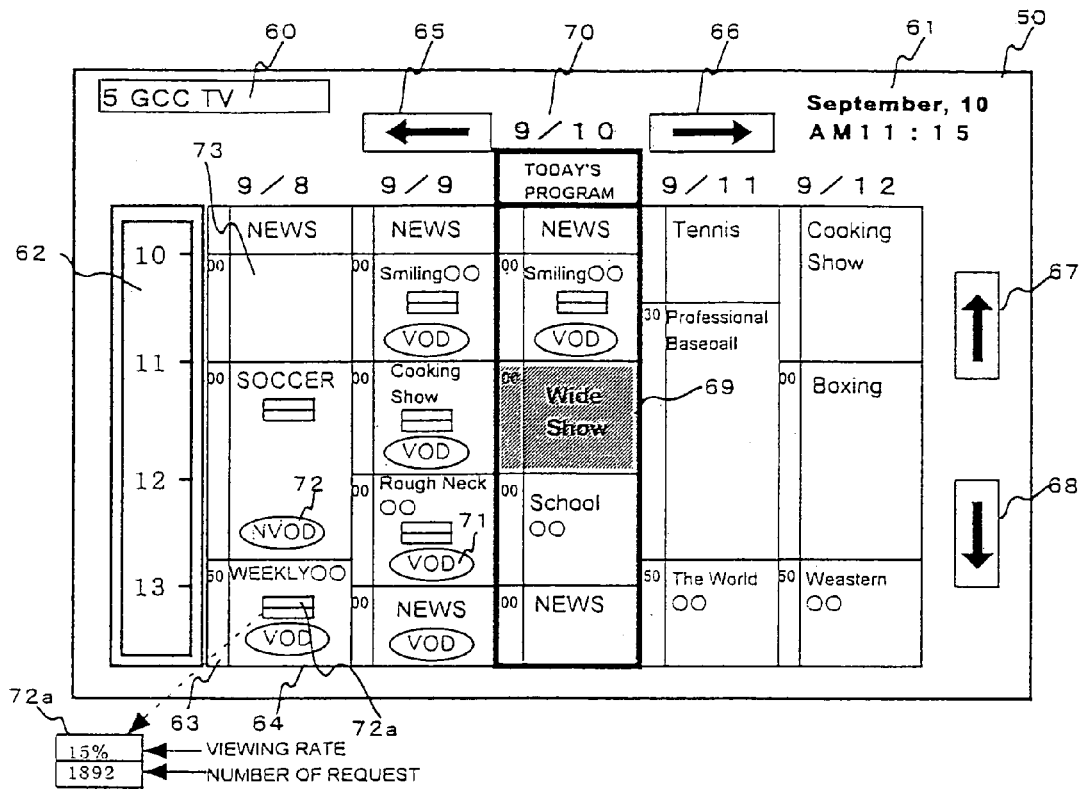
FIG. 6A is a front view showing a channel specification grid type screen of EPG according to the embodiment of the present invention (No. 1)
Figure 6B:
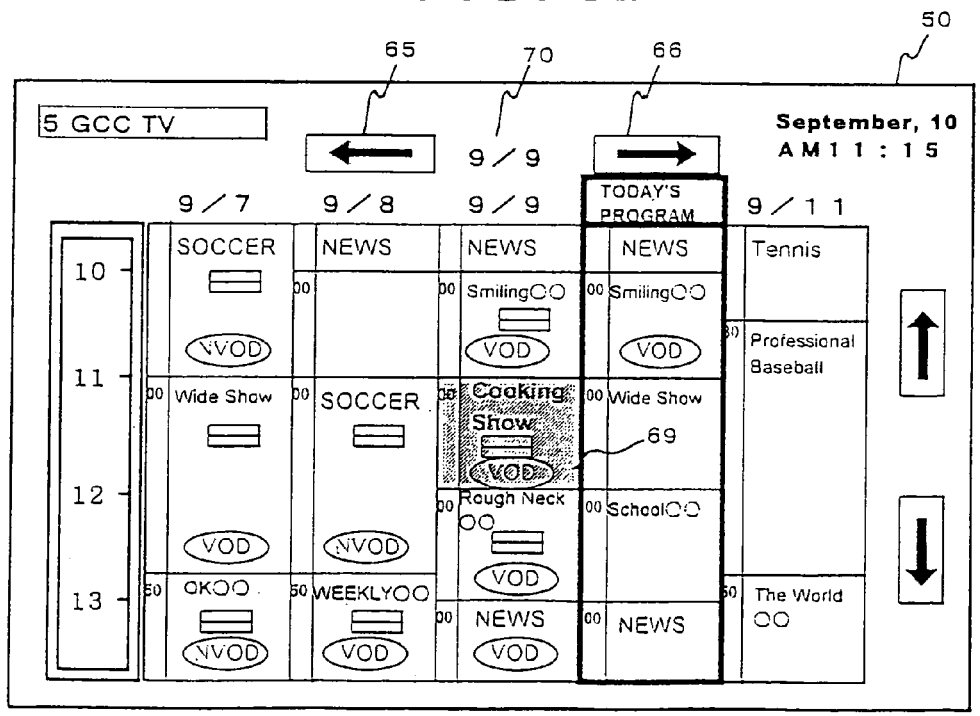
FIG. 6B is a front view showing a channel specification grid type screen of EPG according to the embodiment of the present invention (No. 2)
Figure 7:
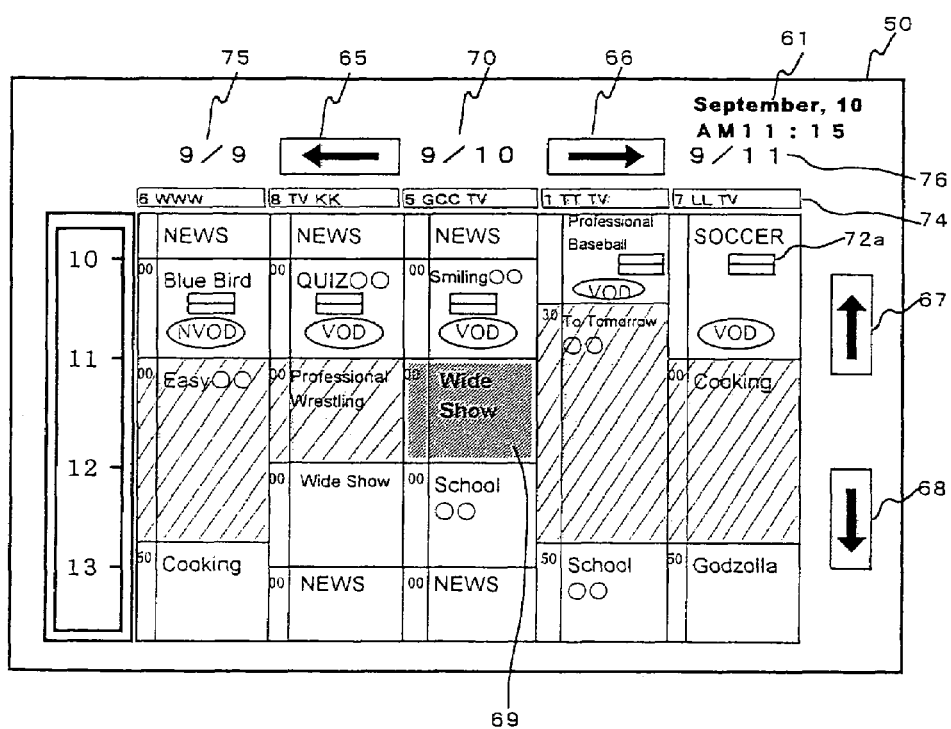
FIG. 7 is a front view showing a date specification grid type screen of EPG according to the embodiment of the present invention.

An arrow key 87 is a key to move a highlight display to an item to be desirably selected on the EPG screen. Such an operation of the key 87 enables the highlight display to be moved upward or downward, or left or right. A determination key (SELECT) 88 is a key to execute the contents of the highlighted item. For example, if the viewer presses down the determination key 88 under the condition of the display shown in FIG. 5, namely, under the condition that the item [Channel Specification Grid Type] 51 is highlighted, the EPG screen 50 of the item "Channel Specification Grid Type" 51 is displayed on the monitor 39, as shown in FIGS. 6A, 6B. The EPG screen of "Channel Specification Grid Type" is the screen which indicates a guide from the past-broadcast programs to the future broadcast programs on one focused channel. The viewer can select a program between the displayed programs on the EPG screen of "Channel Specification Grid Type". Under the condition of the display shown in FIG. 5, if the arrow key 87 is used to move the highlight display to an item "Date Specification Grid Type" 52 and then the determination key 88 is pressed down, an EPG screen 50 of the item "Date Specification Grid Type" 52 is displayed as shown in FIG. 7. The EPG screen of "Date Specification Grid Type" is the screen which indicates a guide of broadcast programs on a specific day on a plurality of focused channels. The viewer can select a program between the displayed programs on the EPG screen 50 of the item "Date Specification Grid Type". Similarly, if an item "Past Popular Program List" 53 shown in FIG. 5 is determined, an EPG screen 50 shown in FIG. 8 is displayed. If an item "Past Search List" 54 is determined, an EPG screen 50A shown in FIG. 9 is displayed. If an item of "Movie" is selected on the EPG screen 50A, an EPG screen 50B is displayed as shown in FIG. 9. Further, if an item of "Foreign Movie" is selected on the EPG screen 50B, an EPG screen 50C is displayed as shown in FIG. 9. The EPG screen 50 of "Past Popular Program List" shown in FIG. 8 is the screen which indicates information with regard to the programs in the order of descending viewing rates of programs broadcast in the past. The viewer can select a program between the displayed programs on the EPG screen 50 of "Past Popular Program List" shown in FIG. 8. The EPG screen 50C of "Past Search List" shown in FIG. 9 is the screen to search the programs broadcast in the past.

Scroll keys 89 to 92 of the remote controller 40 are the keys to scroll a screen. If a screen can not be displayed on the display at the same time, the screen is scrolled in a direction indicated by each arrow, and displayed. The key 89 can be also used for a rewind operation in a case of an NVOD program. The key 90 can be also used for a fast-forward-operation in the case of the NVOD program. In addition, the remote controller 40 has a key 93 to switch the program channels in the order of ascending or descending, a key 94 to turn up or down the volume of an audio outputted from the monitor 39, a key 95 to turn on or off a main power supply of the terminal device 2 (the connection to the CATV network is maintained even if the main power supply is turned off), a key 96 to turn on or off a power supply of the monitor 39, a key 97 to directly enter a channel number and then switch a channel between the channels, a key 98 to indicate an explanation of a program on the display and the like (keys 150 to 155 will be explained later).

An EPG screen 50 shown in FIG. 6A is an EPG screen 50 of "Channel Specification Grid Type", and it indicates the broadcast programs from about 10:00 to about 13:00 corresponding to five days in one broadcasting station ("GCC TV" of a five-channel denoted by a numeral 60). If an EPG screen 50 is displayed, the last received channel is displayed. A numeral 61 denotes a present date and time. A numeral 62 denotes hours of the broadcast time of a program and a numeral 63 denotes minutes of the broadcast time of it. As denoted by a numeral 64, each program is indicated in each cell. Information with regard to a name of a program, contents of a program, performers, VOD (denoted by a numeral 71), NVOD (denoted by a numeral 72) and the like is indicated in each cell. The displays of the VOD and the NVOD are indicated for the past programs. Each of them indicates that a type of a transmission of the requested program is any one of the VOD and the NVOD.

As for the past program, the viewing rate at a time of the broadcast and the number of requests after the broadcast (a frequency in a case of a certain period) can be displayed as denoted by a numeral 72*a*. Thus, the viewer can select and request a popular program.

The program currently being selected is highlighted as denoted by a numeral 69, and assigned at a substantial center of the screen. In short, if the EPG screen is displayed, the currently broadcast program of the channel received by that time is displayed at the substantial center of the screen. The broadcast date of the selected program is displayed in a portion denoted by a numeral 70.

The information of the each item shown in FIG. 3 may be indicated in each cell on the EPG screen 50. For example, the display of the accumulation schedule period denoted by the numeral 23 shown in FIG. 3 can prevent the viewer from missing a chance of a request.

The arrow indications denoted by the numerals 65 to 68 indicate the shift directions of the date and time, and correspond to an arrow key 87 of the remote controller 40.

Under the condition shown in FIG. 6A, if the viewer presses down an arrow on a right side of the arrow key 87 of the remote controller 40, the screen is shifted left so that a column of September 11, the next day, is assigned at the center. If the viewer presses down an arrow on a lower side, the screen is shifted upward so that a next program (whose name is "School OO" on the EPG screen 50 shown in FIG. 6A) is assigned near the center. Also, the program assigned near the center is highlighted and becomes at a selection state. Under the condition of the display, if the viewer presses down the determination key 88, the CPU 25a of the system controller 25 controls a necessary tuner and signal processor so as to select the channel and output the image and the audio of the program, currently being broadcast, to the monitor 39.

Again referring to FIG. 4, the data in relation to the program currently being broadcast from the center device 1 is received by the tuner 31 through the CATV network 3 and the mixer distributor 26 of the terminal device 2.

The tuner 31 converts the data into a frequency suitable for a demodulation, and outputs to the analog signal processor 32 or the digital signal processor 33.

The analog signal processor 32, if the program data is transmitted in the NTSC (National Television System Committee) format, carries out the processing of the program data, and has an NTSC demodulator. The NTSC demodulator carries out an AM demodulation of an image signal, an FM demodulation of a voice signal, a separation of a voice multiplex signal, and a selection of the voice multiplex signal. Also, the NTSC demodulator releases a limited receiving scramble. The limited receiving scramble is a kind of encryption performed on a program in which a receiving is limited. It is intended that the demodulation can not be normally done without a particular procedure such as a contract and the like.

The digital signal processor 33, if the program data is transmitted in a broadcast method of a digital signal, carries out the processing of the program data. The digital signal processor 33 has a demodulator 33a, a reconstruction device 33b, a de-multiplexer 33c, a decoder 33d and a limited receiving de-scramble 33e.

The demodulator 33a demodulates a 64 QAM signal. In the demodulator 33a, processing, such as a carrier reproduction, a quadrature detection, a roll-off filtering, a clock reproduction, a de-mapping, etc., is performed.

The reconstruction device 33b carries out a de-interleave, an error correction, an energy inverse diffusion and the like. The de-interleave is used to release an interleave and improve error-correcting capability of a burst error in combination with a Reed-Solomon (error correction) code. The error correction decodes the Reed-Solomon code. For example, if a correcting code is [204, 188], it is possible to correct an error up to 8 bytes per a packet having a size of 204 bytes before the error correction. The energy inverse diffusion restores an energy-diffused signal to an original state. An energy diffusion implies that an energy distribution in a used band is made uniform, and at the same time, in order to make a clock reproduction easy, an input data is diffused by using a pseudo random signal on a transmission side. In order to restore it to an original data row, the same pseudo random signal is generated in the energy inverse diffusion. Then, an exclusive-OR operation is carried out between it and the reproduced data.

The de-multiplexer 33c separates the transport stream in which a plurality of programs are multiplexed, and extracts a bit stream of image data and voice data in a desirable program.

The decoder 33d expands the bit stream of the image and the voice compressed in accordance with the MPEG 2.

The limited receiving de-scramble 33e releases a cipher of the transport stream encrypted for the limited receiving.

The program data processed by the analog signal processor 32 or the digital signal processor 33, comprising the image or voice signal of the base band, is outputted to the signal switcher 34.

The signal switcher 34 switches between the image and voice signals in accordance with the control signal from the system controller 25, and outputs to the monitor 39. Also, the signal switcher 34 outputs the image and voice signals through the RF modulator 35 to the monitor 39. The RF modulation is a method for re-modulating the base band output. It modulates to a vacant channel, for example, in a case of Tokyo, to an RF signal of a channel. "2".

As mentioned above, the viewer can view the program currently being broadcast by actuating the remote controller 40. The programs currently being broadcast from the center device 1 correspond to the number of channels. FIG. 7 shows the guide of the broadcast programs in the respective channels of "today". When this EPG screen is displayed, the contents of the channel received until that time are positioned on a central row of the screen. The program received until that time, namely, the program currently being broadcast is displayed so as to be positioned on a substantially central stage of the screen. A cell with regard to the program currently being broadcast is colored such that it is discriminated from other programs, such as the already broadcast programs, and the broadcast schedule programs. The program currently being selected is highlighted as described in FIG. 6A. When the viewer actuates the arrow key 87 of the remote controller 40 in this display condition, selecting the program which the viewer wants to view among the programs currently being broadcast, and pressing the determination key 88, the viewer can instantly view the program.

On the other hand, when the viewer presses an arrow on a left side of the arrow key 87 of the remote controller 40 in the display condition shown in FIG. 6A, the screen is shifted right so that a column of September 9, a previous day, is positioned at a center. A past broadcast program (in FIG. 6B, "Cooking Show") denoted by a numeral 69 is highlighted. In short, since the viewer presses the arrow on the left side of the arrow key 87, a program located immediately near the left side of the program "Wide Show" selected until that time is selected. When the viewer presses the determination key 88 in this display condition, a request processing with regard to the already broadcast program according to the present invention is performed. That is, since the viewer presses the determination key 88, the CPU 25a of the system controller 25 transmits the program request signal as the upstream data through the CATV network 3 to the center device 1. The program request signal includes an address of a terminal device 2 of a transmission source and a program identification number (ID) of the request program.

As a result, as mentioned above, the already broadcast past program stored in the request memory/reproducer 17 of the center device 1 is transmitted through the CATV network 3 to the terminal device 2. Thus, the viewer can instantly view such a program. Hence, even if the viewer forgets to view the program, the viewer can easily view such a program. Also, it is possible to save labor for a record reservation (programming for recording) on a video. However, as denoted by a numeral 73 of FIG. 6A, in a case of a program whose name, etc., are not indicated within the cell (or may be indicated light), the item of the request allowance or rejection on the EPG data as mentioned above is set at the rejection. That is, the program data is not stored in the request memory/reproducer 17. Hence, the viewer can not view such a program.

A program denoted by a numeral 71 of FIG. 6A is a VOD program. If such a program is selected and determined, a program data is basically transmitted to only a terminal device 2 requesting such a program. Also, a program denoted by a numeral 72 is an NVOD program. For example, as denoted by a numeral 24 of FIG. 3, such a program is periodically shifted at an interval of 30 minutes, and broadcast a plurality of times. Thus, even if the terminal device 2 transmits a program request signal, the program data of such NVOD is not transmitted immediately from the beginning of the program.

If such an NVOD program is requested, the terminal device 2 refers to an EPG data, obtaining a channel number of a shift to be immediately started and a start time of its channel, and indicating its information on a monitor screen. Also, at the start time, the terminal device 2 selects the channel, receiving the requested program from the beginning thereof. At a time of the request, for example, the channel of the immediately started shift may be immediately selected so that he viewer can immediately view it.

After viewing the NVOD program is started, the functions simulating the quick traverse operation and the rewind operation can be carried out similarly to the conventional NVOD program. That is, it is possible to carry out the operations simulating various reproduction actions of VTR. Such operations are carried out by using a remote controller 40 shown in FIG. 10. Actually, when a rewind key 151 shown in FIG. 10 is pressed, the present channel is shifted to a channel broadcast after a 30 minute delay. When a quick traverse key 152 is pressed, the present channel is shifted to a channel broadcast 30 minutes ahead. Also, when a tentative stop key 153 is pressed, a receiving is tentatively interrupted. When the key 153 is pressed again, or when a reproduction key 150 is pressed, the present channel is shifted to a channel in which images after the interrupted time are transmitted at the earliest timing. Also, when a stop key 154 is pressed, the receiving is stopped. The processing through those operations can be performed in the terminal device 2. In addition, the rewind key 151 may be also used as the key 89, the quick traverse key 152 may be also used as the key 90, and the stop key 154 may be also used as a CLEAR key 155.

In a case of the transmission of the request program through the VOD, it is basically transmitted only once. However, a service for carrying out the operations simulating the various reproduction actions of the VTR is added as is the case with the NVOD. In the case of the VOD program, if it is transmitted in one-to-one communication, it is possible to provide a service specialized for its terminal device (viewer). It is possible to carry out an operation closer to the VTR than the NVOD program. For example, when the rewind key 151 or the quick traverse key 512 is actuated, a control signal corresponding to the actuation is transmitted to the center device 1. The center device 1 intermittently returns or forwards a read position for a program reproduction. When the tentative stop key 153 is actuated, a static picture is displayed. The reproduction is resumed by the re-actuation or the actuation of the reproduction key 150. The receiving is interrupted by pressing the stop key 154 as is the case with the NVOD.

When the stop key 154 is not actuated, in the case of the VOD program, the selection of the station is released, for example, after an elapse of a viewing period of a program length corresponding to one time. Also, in the case of the NVOD program, the selection of the station is released, for example, after an elapse of a viewing period of a program length corresponding to one time from a start time of a program started at the earliest timing. However, if the special reproduction is possible as mentioned above, this results in a trouble that the viewer can not view the request program up to the end, in such a broadcast, for example, when the rewind or the tentative stop is actuated. To prevent such a trouble, in the case of the VOD program, considering a fact that the center device 1 stops transmitting such a program after the request program is reproduced up to the end, the terminal device 2 can release the selection of the station when there is no receiving signal of the request program. Also, in the case of the NVOD program, the selection of the station may be released when an end time of the shift in the channel during the selection of the station is reached.

In addition to the continuous display of the past program, the program currently being broadcast and the future program, various programs may be displayed on the EPG screen 50, as shown in FIGS. 6A, 6B. For example, those programs may be independently displayed, or only the program which can be requested may be displayed.

The EPG screen 50 of the past popular program list shown in FIG. 8 is a service screen which displays thereon the past broadcast programs in an order of the viewing rates. It is automatically generated by the EPG generator 25d of the system controller 25, in accordance with the EPG data. The viewer can view even the program displayed on the screen by the request processing of the already broadcast program according to the present invention, when highlighting the desirable program denoted by a numeral 77 and actuating the determination. The EPG screens 50A, 50B, and 50C of the past search lists shown in FIG. 9 are service screens to search the past broadcast programs. For example, when the viewer actuates the remote controller 40 to switch the screens in the order of the screens 50A, 50B, and 50C so that they are displayed in the order, and finally presses the determination key 88 for "Easy . . . " highlighted as denoted by a symbol 80 in the screen 50C of FIG. 9, the request processing of the already broadcast programs is executed as is the above-mentioned case. Thus, the user can view the program. Such a service screen can be attained only by the present invention. In addition, a screen in which only serial dramas are gathered, or a screen in which only minor programs are gathered may be provided as the service screen.

The request of the already broadcast program according to the present invention can be done by using the telephone line 4 through the modem 36.

An apparatus such as a personal computer, a game machine, a KARAOKE machine, and external apparatus such as a printer, a needle detector, etc., can be connected through a parallel input/output 37 or a serial input/output 38 shown in FIG. 4, to the terminal device 2. A communication function, such as transfer of a program, a data, etc., can be added to the terminal device 2.

Moreover, the terminal device 2 has a data communicator 41 shown in FIG. 4. The data communicator 41 uses the CATV network 3 to carry out the services of a telephone, a facsimile, a personal computer communication, etc. It is possible to expand the functions of the program transmitting/receiving system according to the present invention. For example, it can be used for various data communications between the terminal device 2 and the center device 1 necessary to the present invention.

A transmission path access controller 41a mounted in the data communicator 41 carries out a control so that many subscribers can share the limited channels. It can execute control methods such as TDMA (Time Division Multiple Access), FDMA (Frequency Division Multiple Access), CDMA (Code Division Multiple Access), etc.

A communication terminal interface 41b mounted in the data communicator 41 supports an interface to another terminal device through a communication input/output 42. An analog subscriber line interface (which is an interface to an analog telephone and has a function referred to as [BORSCHT]), an ISDN (Integrated Services Digital Network) interface, or a LAN (Local Area Network) interface (for example, Ethernet) can be used for the communication terminal interface 41b. For example, a requested program can be transmitted and received in a data form of Internet, and viewed by a monitor of a computer. In this case, the center device 1 carries out a modulation corresponding to it.

Or, an image signal received in the data form of Internet may be converted into an NTSC type image signal by the system controller 25, and outputted through the signal switcher 34 to the monitor 39.

Figure 11:
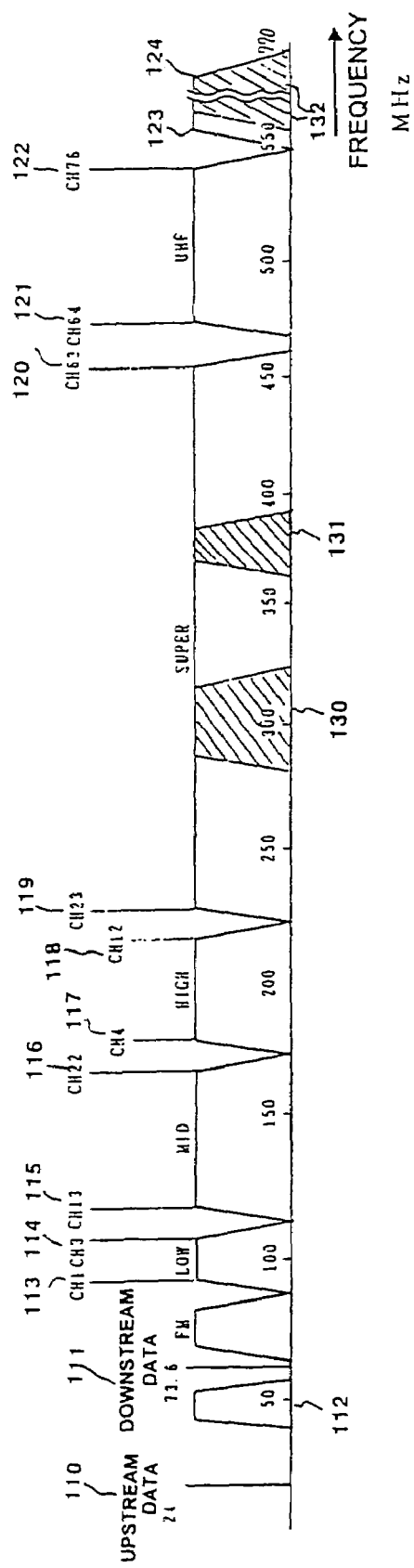
FIG. 11 is a view showing an assignment of a carrier frequency of data communicated in a CATV network according to the embodiment of the present invention.

The communication device 3 is configured as the CATV network 3, as mentioned above. So, it can enable the two-way data communication between the center device 1 and each terminal device 2. Each data targeted for a communication is assigned to an independent frequency band and transmitted as shown in FIG. 11. For example, the above-mentioned upstream data is assigned to a frequency band denoted by a numeral 110 shown in FIG. 11 (an upstream data channel), the downstream data is assigned to a frequency band denoted by a numeral 111 (a downstream data channel), and they are transmitted. Those bands denoted by the numerals 110, 111 are the communication bands established for a conventional analog system, and they are the channels for mainly communicating the data except the program data. Also, a frequency band denoted by a numeral 112 shown in FIG. 11 (from 35 MHz to 55 MHz) is a tow-way data communication band established for a digital system.

In FIG. 11, portions denoted by numerals 113, to 124 are originally the channels for a usual analog (NTSC format) television broadcast and a usual digital television broadcast. However, in the present invention, particular areas indicated by hatching (portions denoted by numerals 130 to 132) are assigned to an exclusive transmission of a request program. An upper limit of a frequency is 770 MHz in FIG. 11. However, the number of channels may be increased by using a band up to a giga-Hz band.

A program having a high request frequency is always transmitted by using the above-mentioned channel dedicated to the transmission of the request program as is the case with the NVOD program in the normal broadcast, in order to improve the channel efficiency. On the other hand, a program having a low request frequency is transmitted as is the case with the VOD program, and the transmission is basically performed in one-to-one communication. Although the channel efficiency is decreased, some of the channels dedicated to the transmission of the request program are prepared for the VOD.

Those program data can be converted into the compression digital data, as mentioned above, and can be assigned to a 6 MHz band as four to six programs to be transmitted. Thus, even if there are many requests, it is possible to correspond to them. Although a quality of image declines, the number of programs corresponding to requests at the same time can be increased by using greater compression rate.

The transmission of the program having the low request frequency through the VOD may be performed by using a moving picture communication used in the Internet, etc., without using the conventional analog or digital television method. In this case, the downstream data channel denoted by the numeral 112 can be used. However, a carrier for data communication may be installed in the channel dedicated to the transmission of the request program so that it is possible to correspond to many requests.

The operations immediately after the actuation of the program transmitting/receiving system will be explained below with reference to FIG. 12.

At first, the schedule generator 11 of the center device 1 generates the EPG data shown in FIG. 3, in accordance with the information of the program broadcast schedule or the information of the program itself, based on a command from the controller 10 (S1). Next, the schedule generator 11 outputs the generated EPG data through the modulator 12 to the mixer distributor 20, based on a command from the controller 10. Then, the mixer distributor 20 transmits the EPG data through the CATV network 3 to all the terminal devices 2 connected to the center device 1 (S2). Also, the schedule generator 11 generates the program broadcast schedule in accordance with the EPG data (S3).

Next, the controller 10 refers to the program broadcast schedule generated by the schedule generator 11, and instructs the memory reproducer 15 to reproduce the program data, based on such a schedule (S4). Then, the selector 16 assigns the program data, which is reproduced and outputted by the memory reproducer 15, to respective channels, in accordance with a command from the controller 10 (S5), and outputs to the request memory reproducer 17 and the multiplex converter 18. The request memory reproducer 17 stores the program data outputted by the selector 16, in accordance with a command from the controller 10 (S6). Thus, the data of the program currently being broadcast are sequentially stored so as to be readable, which enables the transmission through the request of the program according to the present invention. The multiplex converter 18 converts the program data outputted by the selector 16 into the compression digital data (transport stream) in a form of packet, and outputs it. The modulator 19 digitally modulates the program data which is compressed and outputted by the multiplex converter 18, for example, through the 64 QAM, and outputs it to the mixer distributor 20. Then, the mixer distributor 20 transmits it through the CATV network 3 to all the terminal devices 2 (S7). The multiplex converter 18 does not perform any operation on the program data of the program to be transmitted in the analog manner. The modulator 19 carries out the modulation meeting the NTSC format. Hence, a plurality of programs assigned to the respective channels are broadcast to the terminal devices 2.

The tuner 31 of the terminal device 2 receives the program data transmitted by the center device 1, through the mixer distributor 26 (S8). The CPU 25a of the system controller 25 determines whether or not the selected program data is transmitted in the NTSC format (S9). If it is not transmitted in the NTSC signal format, the tuner converts such program data into a frequency suitable for a demodulation, and it is outputted to and processed by the digital signal processor 33 (S10). On the other hand, if the program data is transmitted in the NTSC signal format, the tuner 31 converts such program data into the frequency suitable for the demodulation, and it is outputted to and processed by the analog signal processor 32 (S11). Here, the explanation is done under the assumption that such program data is the compression digital data and it is outputted to the digital signal processor 33.

The digital signal processor 33 extracts the image and voice data of a desirable program from a bit stream of image and voice data which are compressed and multiplexed, and carries out the de-scramble as necessary, and demodulates to the image and voice signal of a base band, and outputs it to the signal switcher 34 (S12).

Accordingly, the image and the voice of the program broadcast by the center device 1 become at a state that they can be outputted from the signal switcher 34 to the monitor 39, in accordance with a command from the system controller 25.

The operations of the program transmitting/receiving system when a viewer views a program will be explained below with reference to FIGS. 13, 14.

Figure 12:
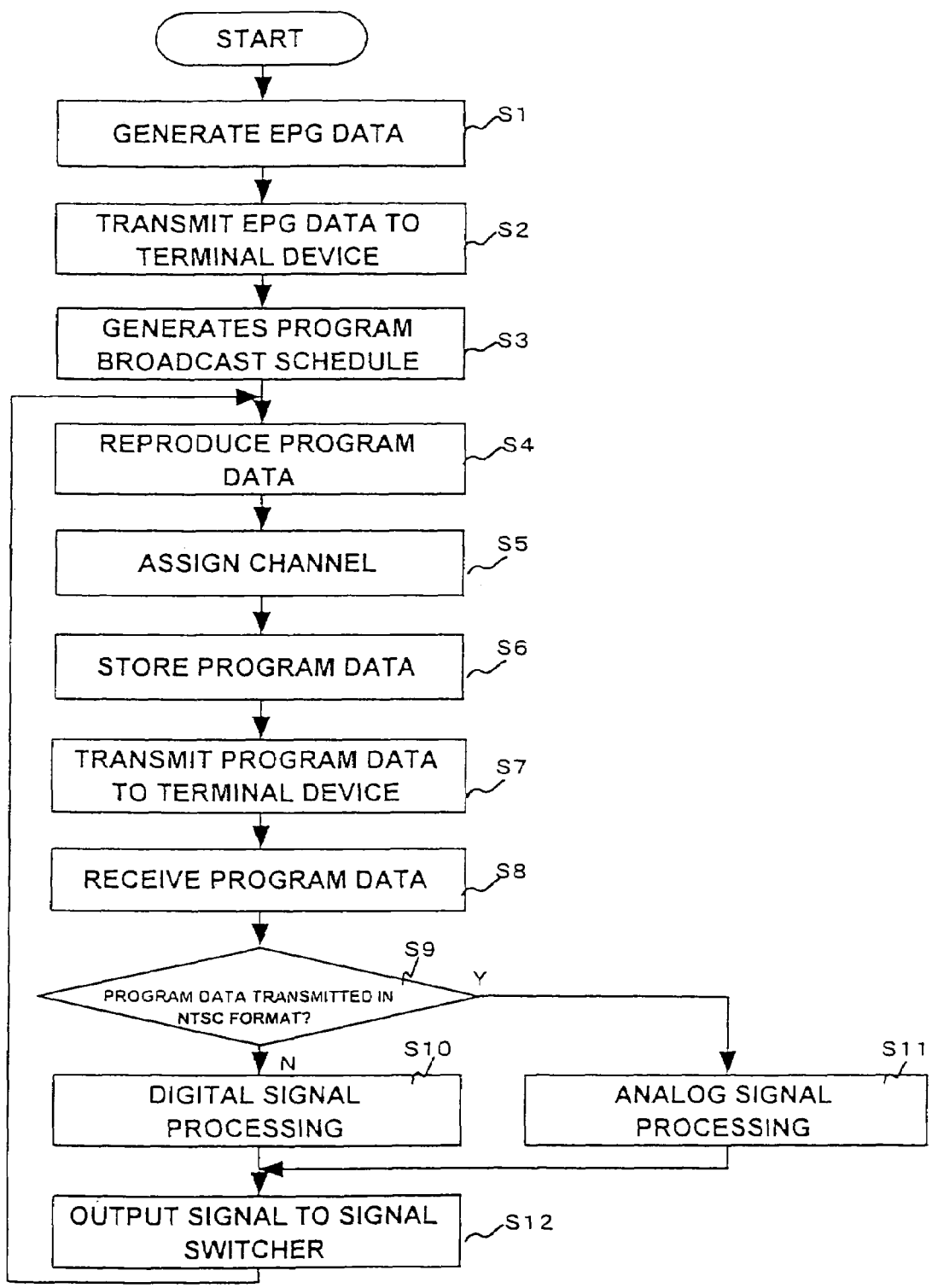
FIG. 12 is a flow chart showing a process at a time of start-up of a program transmission and reception system according to the embodiment of the present invention.
Figure 13:
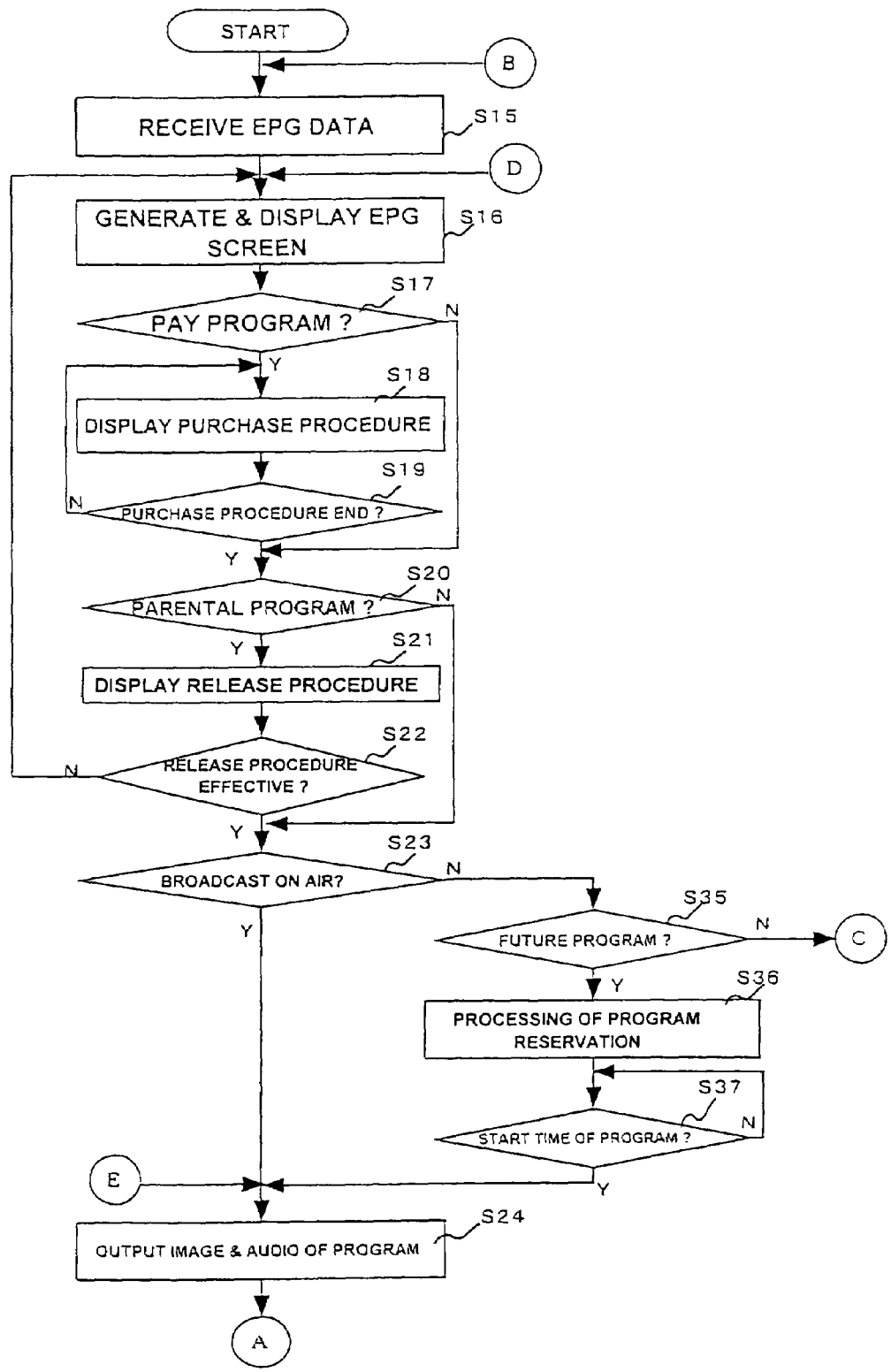
FIG. 13 is a flow chart showing a process when a viewer views a program, in the program transmission and reception system according to the embodiment of the present invention.

The EPG data transmitted by the center device 1 at the step S2 of FIG. 12 is received by the tuner 27 through the mixer distributor 26 of the terminal device 2, as illustrated at a step S15 of FIG. 13. The tuner 27 converts the received EPG data into a frequency suitable for a demodulation and outputs it to the demodulator 28. Then, the demodulator 28 demodulates the EPG data and outputs it to the system controller 25.

The EPG generator 25d of the system controller 25 generates an EPG screen 50 in accordance with the EPG data. The signal switcher 34 indicates the EPG screen 50 on the monitor 39, in accordance with a command from the CPU 25a (on the basis of a remote control operation of the viewer) (S16). Accordingly, the viewer can view the EPG screens 50 shown in FIGS. 5 to 9, on the monitor 39.

When the viewer selects a program which the viewer desires to view by using the arrow key 87 of the remote controller 40 and presses the determination key 88, the CPU 25a of the system controller 25 refers to the EPG data, and determines whether or not a fee of the selected program is charged (S17). If it is determined that the fee of the program is charged, the CPU 25a indicates a screen for a purchase procedure on the monitor 39 (S18). The viewer actuates the remote controller 40, and carries out the purchase procedure while viewing such a screen. Then, the CPU 25a determines whether or not the purchase procedure is ended (S19). If the CPU 25a determines that it is ended, the operational flow proceeds to a step S20.

At the step S20, the CPU 25a determines whether or not such a program is a parental program (a program in which a view is limited). If it is determined that the program is a parental program, the CPU 25a indicates a screen for a release procedure on the monitor (S21). The viewer actuates the remote controller 40, and carries out the release procedure while viewing such a screen. Then, the CPU 25a determines whether or not the release procedure is effective (S22). If the CPU 25a determines that it is effective, the operational flow proceeds to a step S23.

The CPU 25a refers to the EPG data, and determines whether or not the selected program is a program currently being broadcast (on air) (S23). If it is determined that the program is a program currently being broadcast, the operational flow proceeds to a step S24. On the other hand, if it is determined that the program is not currently being broadcast, the operational flow proceeds to a step S35.

The CPU 25a outputs a control signal for switching an image and voice to those of the selected program, to the signal switcher 34. The signal switcher 34 outputs the image and the voice of the program onto the monitor 39, in accordance with such a control signal (S24). Accordingly, the viewer can view the desirable program on the monitor 39.

Figure 14:
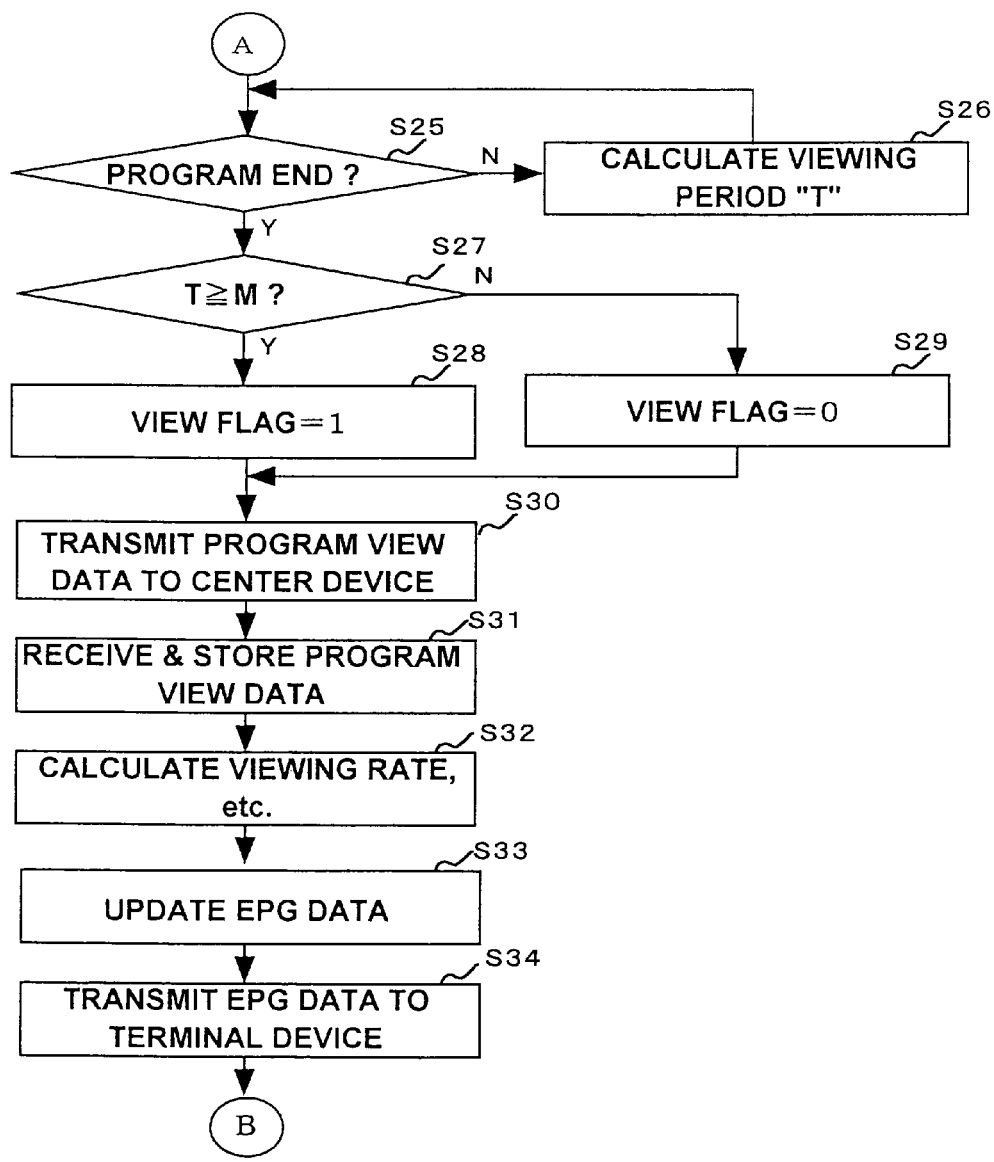
FIG. 14 is a flow chart showing a process when a viewer views a program, in the program transmission and reception system according to the embodiment of the present invention.

As shown in FIG. 14, the CPU 25a determines whether or not the program outputted onto the monitor 39 is ended (including a case that the viewer switches to another program) by comparing a current time with an end time of the program based on the EPG data (S25). While the program is not ended, the CPU 25a calculates a viewing period T-minute (a period while the program is selected) (S26). If the CPU 25a confirms the end of the program, the CPU 25a stores the viewing period T-minute in the RAM 25b, and also determines whether or not the viewing period. T-minute is equal to or longer than a standard period M-minute (S27). If it is determined that the viewing period T-minute is equal to or longer than the standard period M-minute, the CPU 25a determines that such a program is viewed, and sets a view flag to 1, and stores it in the RAM 25b (S28). On the other hand, if it is determined that the viewing period T-minute is shorter than the standard period M-minute, the CPU 25a sets the view flag to 0, and stores it in the RAM 25b (S29). Here, the view flag implies that the program is actually viewed if the view flag is set to 1, and it serves as a basic data when the viewing rate, etc., are calculated in the center device 1 later. Also, the operator of the center device 1 can freely define the standard period M-minute, for example, as 20 minutes. A rate such as N % of a length of a program (for example, 70%) may be used as a standard, instead of the standard period M-minute. Moreover, the selected period itself may be stored in the RAM 25b as the program view data.

Next, the CPU 25a transmits the program view data through the modulator 29, the frequency converter 30, the mixer distributor 26 and the CATV network 3 to the center device 1 (S30).

The program view data transmitted by the terminal device 2 is received by the center device 1, and stored in the schedule generator 11 (S31). The schedule generator 11 in the center device 1 totals the program view data transmitted by the respective terminal devices 2, and calculates the viewing rate, etc.(S32). The schedule generator 11 also totals the program request signals transmitted by the respective terminal devices 2. Also, the schedule generator 11 updates the EPG data in accordance with the calculated viewing rate, etc. (S33). The updated EPG data is transmitted through the CATV network 3 to the terminal device 2 (S34). The EPG screen 50 is changed, as necessary, in accordance with such data. Moreover, a new past popular program list (referred to FIG. 8) is prepared in accordance with the updated view rate.

On the other hand, when the operational flow returns to FIG. 13, if it is determined at the step S23 that the program is not the program currently being broadcast, the CPU 25a determines whether or not such a program is one to be broadcast in future (S35). If it is determined that the program is one to be broadcast in future, the CPU 25a indicates a programming screen (program reservation screen) on the monitor 39, and instructs the viewer to set a time for recording the program (program reservation), etc.(S36). Then, when the set time is reached (S37), the CPU 25a instructs the operational flow to proceed to the step S24, or the program is recorded.

Figure 15:
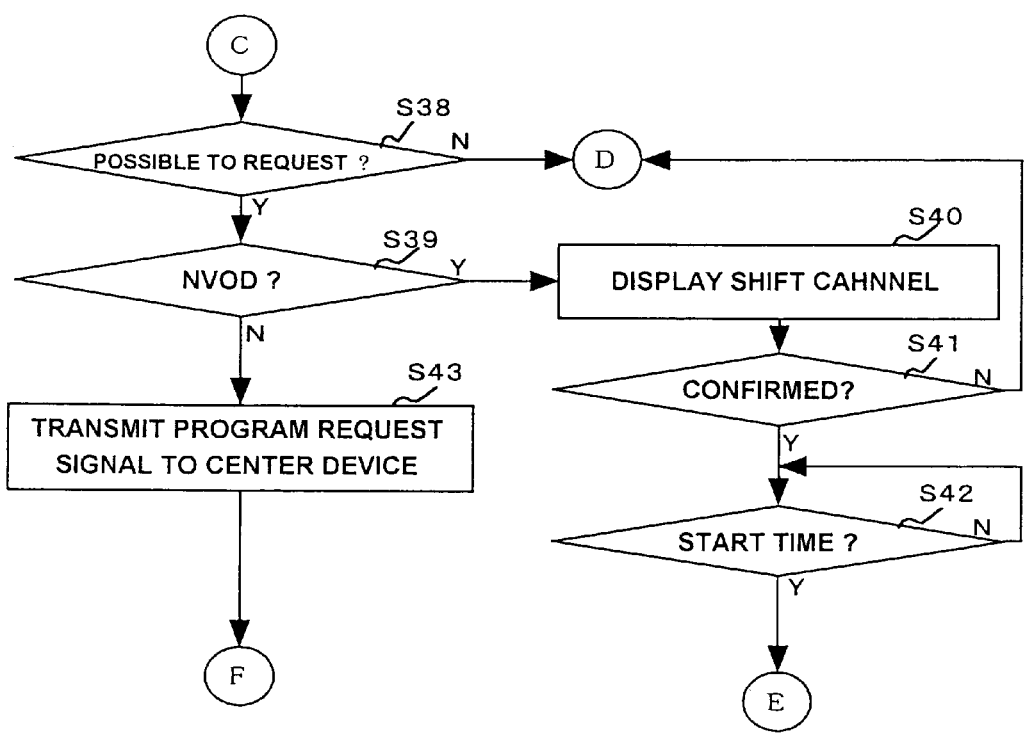
FIG. 15 is a flow chart showing a process when a viewer requests an already broadcast program, in the program transmission and reception system according to the embodiment of the present invention.
Figure 16:
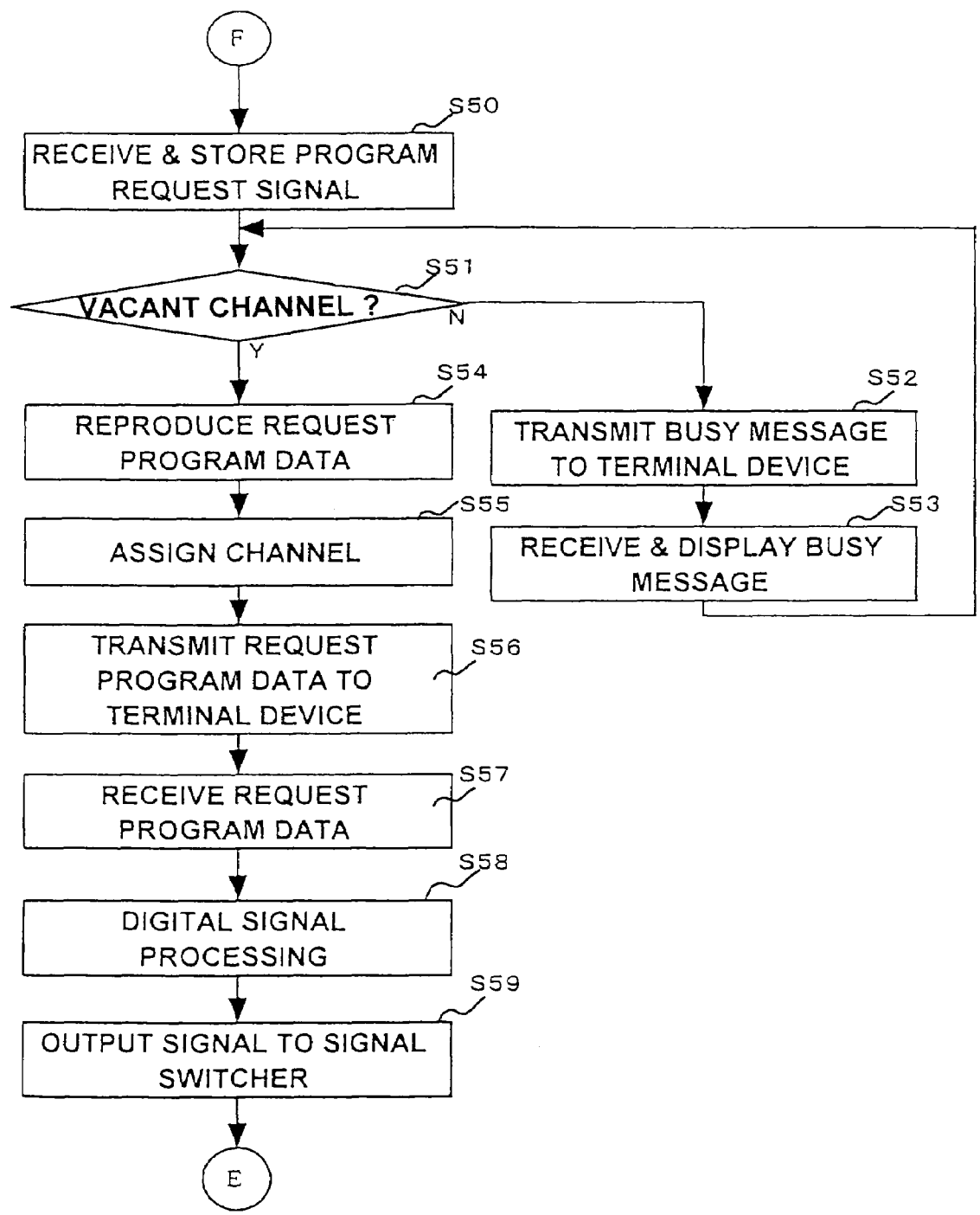
FIG. 16 is a flow chart showing a process when a viewer requests an already broadcast program, in the program transmission and reception system according to the embodiment of the present invention.

On the other hand, if it is determined at the step S35 that the program is not one to be broadcast in future, namely, if it is the already broadcast program, a program request processing according to the present invention is started as shown in FIGS. 15, 16.

At first, as shown in FIG. 15, the CPU 25a refers to the EPG data, and determines whether or not such a program can be requested (S38). The determination is performed by referring to the data denoted by the numeral 22 of FIG. 3, as mentioned above. If it is determined that the program can be requested, the CPU 25a determines whether or not the program is the NVOD program (S39). If it is determined that the program is the NVOD program, the CPU 25a indicates the earliest start time and the channel to be shifted, on the monitor (S40). Then, if there is a confirmation signal through the remote controller 40 from the viewer (S41), the CPU 25a waits until the start time (S42). After the reach of such a time, the operational flow returns back to the process at the step S24 of FIG. 13.

On the other hand, if it is determined at the step S39 that such a program is not the NVOD program, the CPU 25a transmits the program request signal through the modulator 29, the frequency converter 30, the mixer distributor 26 and the CATV network 3 to the center device 1 as the upstream data (S43).

As shown in FIG. 16, the center device 1 receives the program request signal transmitted by the terminal device 2, and stores in the schedule generator 11 (S50).

The controller 10 checks a vacant (empty) state of the channel (S51). If there is no vacant channel, the controller 10 transmits a signal indicating that the channels are busy (hereinafter, referred to as a busy message) through the CATV network 3 to the terminal device 2 as the downstream data (S52).

The terminal device 2 receives the received busy message. Then, the CPU 25a of the system controller 25 indicates the busy message on the monitor 39 (S53). The operational flow returns back to the step S51. If the vacant channel does not appear in a predetermined period, the operational flow may return back to the step S61 shown in FIG. 13 and other steps.

On the other hand, if it is checked at the step S51 that there is a vacant channel, the controller 10 instructs the request memory reproducer 17 to reproduce and output the program data corresponding to a program identification signal (ID) included in such a program request signal (S54).

The selector 16 assigns a channel to such request program data (S55). Similarly to the usual program data, the request program data is transmitted through the multiplex converter 18, the modulator 19, the mixer distributor 20 and the CATV network 3 to all the terminal devices 2 (S56). However, if the requested program is the VOD program, such program data is transmitted, and also a channel information to transmit an address information of the terminal and such a program is transmitted to the terminal requesting the program.

The request program data transmitted by the center device 1 is received by a terminal device 2 having a coincident address (S57), and reconstructed by the digital signal processor 33 (S58), and then outputted to the signal switcher 34 (S59). Then, the processing on and after the step S24 of FIG. 13 is carried out to output the image and the voice of the request program onto the monitor 39.

In this way, the viewer, even if forgetting to view the program broadcast in accordance with the schedule, can easily pick up and view the program from the center device 1.

Figure 17:
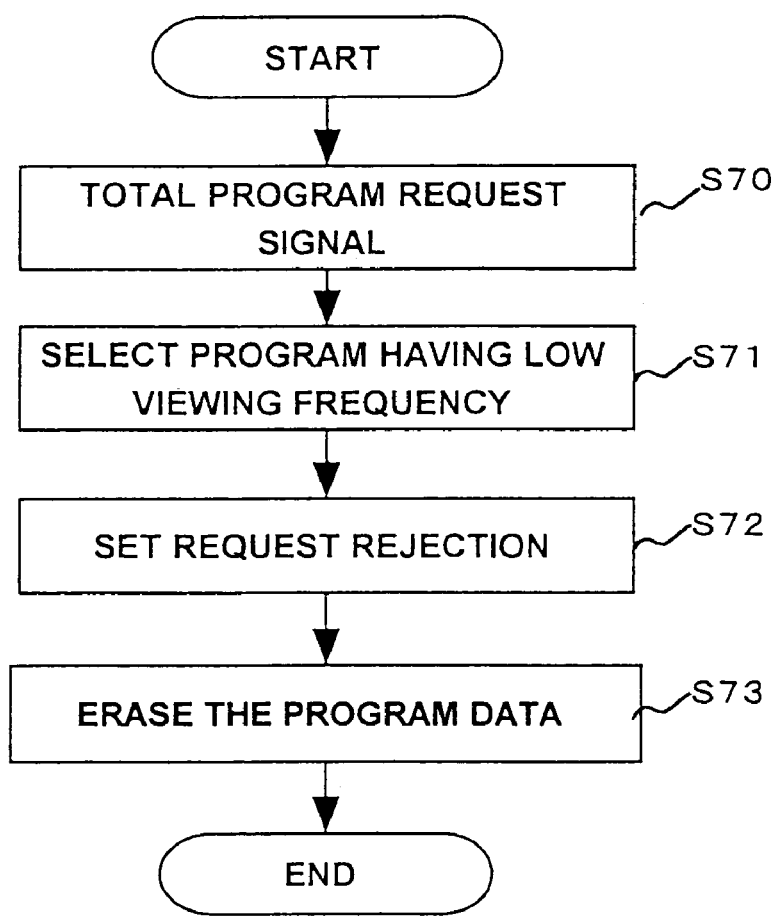
FIG. 17 is a flowchart showing a process when data of a request target program is erased, in the center device according to the embodiment of the present invention.

The operations in the erasure of the request program periodically done in the center device 1 will be explained below with reference to FIG. 17.

At first, the schedule generator 11 reads out and totals the program request signals stored at the step S50 of FIG. 16, in accordance with a command from the controller 10 (S70).

Also, the schedule generator 11 reads out the viewing rate calculated at the step S32 of FIG. 14, etc.

A program having a low viewing frequency is selected in accordance with the information with regard to the totaled program request signal, the view rate or the like (S71). The operator can arbitrarily change such a selection standard.

The schedule generator 11 updates the item of the request allowance or rejection of the EPG data corresponding to the selected program having the low view frequency, to the rejection (S72).

The controller 10 erases the program data corresponding to the program, in which the item of the request allowance or rejection of the EPG data is set at the rejection, from the request memory reproducer 17 (S73). In this way, the program having the low viewing frequency is erased from the request memory reproducer 17. Thus, it is possible to reserve the memory capacity of the request memory reproducer 17.

In the above-mentioned embodiment, the communication device between the center device 1 and the terminal device 2 is configured as the CATV network 3. However, it may use any kind of a line, such as the Internet, a private line, etc. Also, it may use any of a wire line and a wireless line. For example, the present invention can be applied to even a satellite broadcast. A data communication in this case uses the telephone line.

The example that the view rate in the normal broadcast is gathered by the center device 1 is described in the embodiment. However, it may be designed such that the information with regard to programming for recording (record reservation) and programming for viewing (view reservation) in the terminal device 2 is gathered by the center device 1, and the EPG data based on those information is generated, transmitted and displayed on the EPG screen in the terminal device 2.

As mentioned above, the usage of the request broadcast of the already broadcast program according to the present invention can omit the labor for programming for recording (record reservation) in the video and further reduce a purchase cost of a video tape. Moreover, the EPG in which the past popular programs are gathered and the EPG in which the past program can be searched enable the viewer to view a dear program at any time.

The side of the CATV station can obtain a new user by providing an unprecedented new service according to the present invention. Thus, a profit of a service fee is expected. Moreover, the accumulation of other data in relation to the data of the already broadcast program enables the contribution to the growth of other services such as an electronic book etc.

Also, the side of the commercially broadcasting station does not have the necessity of a facility investment. If a totaled result of the program requests can be obtained from the CATV station, the commercially broadcasting station can expect to obtain a new profit from a sponsor of the program.

Moreover, the side of the program sponsor has an effect that many persons view an advertisement.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H(Heisei)11-326576 filed on Nov. 17, 1999 including the specification, claims, drawings and summary is incorporated herein by reference in its entirety.

What is claimed is:

1. A program transmitting/receiving system having a center device and at least one terminal device connected through a communication device to the center device, the center device comprising:
a program information memory device for storing information with regard to a program generated on the basis of a schedule to broadcast a program;
a program information transmitting device for transmitting the information with regard to the program to the terminal device through the communication device;
a broadcasting device for broadcasting the program to the terminal device through the communication device, in accordance with the schedule, and for storing the program therein at a transferable condition to the terminal device; and
a request program transmitting device for receiving a request signal of the program transmitted by the terminal device, and for transmitting the program, corresponding to the request signal of the program and stored at the transferable condition, through the communication device to the terminal device at least transmitting the request signal of the program, and the terminal device comprises:
a program information receiving device for receiving the information with regard to the program transmitted by the center device;
a program receiving device for receiving the program broadcast by the center device;
an image information generating device for generating an image information for a program selection of a user, on the basis of the information with regard to the program;
a program request signal transmitting device for transmitting the request signal of the program selected by the user to the center device through the communication device, if the program selected by the user in accordance with the image information is a past program broadcast in accordance with the schedule from the center device;
a request program receiving device for receiving the program corresponding to the request signal of the program transmitted by the center device; and
a displaying device for displaying the image information on a display,
wherein the information with regard to the program includes statistical data with regard to viewing of the program, and the image information includes information on the basis of the statistical data,
wherein the displaying device displays the image information in a two-dimensional way, and
wherein the statistical data with regard to viewing of the program comprises one of a viewing rate for the past program broadcast in accordance with the schedule from the center device, a number of requests for the past program, and information based on the viewing rate and the number of requests.

2. The program transmitting/receiving system according to claim 1, wherein the information with regard to the program comprises information indicating allowance or rejection of transmitting the program,
the terminal device further comprises a viewing information transmitting device for transmitting viewing information with regard to the program received by the program receiving device or request program receiving device through the communication device to the center device, and
the center device further comprises:
a transmission allowance selecting device for receiving the viewing information and selecting allowance or rejection of transmitting the program on the basis of the viewing information;
a program erasing device for erasing the program stored by program information memory device on the basis of the selection of allowance or the rejection of transmitting; and
a selection updating device for updating information indicating the selection of allowance or the rejection of transmitting on the basis of the selection of allowance or the rejection of transmitting,
wherein the information indicating the selection of allowance or the rejection of transmitting is one indicating whether or not the center device stores the program at a transferable condition to the terminal device in accordance with a request.

3. The program transmitting/receiving system according to claim 2, wherein the information with regard to the program includes the viewing information, and the image information for the program selection of a user includes a display on the basis of the viewing information.

4. The program transmitting/receiving system according to claim 2, wherein the information with regard to the program includes information with regard to viewing frequency or request frequency as the statistical data, and
the center device further comprises:
a calculating device for totaling the viewing information or the request signal of the program and calculating the viewing frequency or the request frequency per program; and
a frequency updating device for updating the viewing frequency or the request frequency on the basis of the calculated viewing frequency or calculated request frequency,
the transmission allowance selecting device selects allowance or rejection of transmitting the program on the basis of the viewing frequency or the request frequency.

5. The program transmitting/receiving system according to claim 2, wherein the program request signal transmitting device transmits the request signal of the program through the communication device to the center device on the basis of the information indicating allowance or rejection of transmitting the program, included in the information with regard to the program and transmitted by the center device.

6. The program transmitting/receiving system according to claim 1, wherein the center device updates the information with regard to the program on the basis of a fact that the program is broadcast by the center device.

7. A center device to which at least one terminal device is connected through a communication device, the center device comprises:
a program information memory device for storing information with regard to a program generated in accordance with a schedule to broadcast a program;
a program information transmitting device for transmitting the information with regard to the program through the communication device to the terminal device;
a broadcasting device for broadcasting the program through the communication device to the terminal device, in accordance with the schedule, and for storing the program therein at a transferable condition to the terminal device; and a request program transmitting device for receiving a request signal of the program transmitted by the terminal device, and for transmitting the program corresponding to the request signal of the program and stored at the transferable condition, through the communication device to the terminal device at least transmitting the request signal of the program, wherein the information with regard to the program includes statistical data with regard to viewing of the program comprising one of a viewing rate for the past program broadcast in accordance with the schedule from the center device, a number of requests for the past program, and information based on the viewing rate and the number of requests.

8. A terminal device connected to a center device having a program and information with regard to the program through a communication device, the terminal device comprises:

a program information receiving device for receiving the information with regard to the program transmitted by the center device;

a program receiving device for receiving the program broadcast by the center device;

an image information generating device for generating an image information for a program selection of a user, in accordance with the information with regard to the program;

a program request signal transmitting device for transmitting the request signal of the program selected by user through the communication device to the center device, if the program selected by the user in accordance with the image information is a past program broadcast in accordance with the schedule from the center device;

a request program receiving device for receiving the program corresponding to the request signal of the program transmitted by the center device; and a displaying device for displaying the image information on a display, wherein the information with regard to the program includes statistical data with regard to viewing of the program, and the image information includes an information on the basis of the statistical data, wherein the displaying device displays the image information in a two-dimensional way; and wherein the statistical data with regard to viewing of the program comprises one of a viewing rate for the past program broadcast in accordance with the schedule from the center device, a number of requests for the past program and information based on the viewing rate and the number of requests.

9. A program broadcasting method in a program transmitting/receiving system having a center device and at least one terminal device connected through a communication device to the center device, comprising:

storing information with regard to a program generated on the basis of a schedule to broadcast a program in the center device;

transmitting the information with regard to the program through the communication device from the center device to the terminal device;

broadcasting the program through the communication device from the center device to the terminal device, in accordance with the schedule;

storing the program in the center device at a transferable condition to the terminal device;

receiving the information with regard to the program transmitted by the center device, in the terminal device;

generating an image information for a program selection of a user, on the basis of the information with regard to the program in the terminal device;

transmitting a request signal of the program selected by the user through the communication device from the terminal to the center device, if the program selected by the user on the basis of the image information is a past program broadcast in accordance with the schedule from the center device;

receiving the request signal of the program transmitted by the terminal device, in the center device;

transmitting the transferable program corresponding to the request signal of the program through the communication device from the center device to the terminal device at least transmitting the request signal of the program;

receiving the program corresponding to the request signal of the program transmitted by the center device, in the terminal device; and displaying the image information on a display, wherein the information with regard to the program includes statistical data with regard to viewing of the program, and the image information includes information on the basis of the statistical data, wherein the process of displaying displays the image information in a two-dimensional way, and wherein the statistical data with regard to viewing of the program comprises one of a viewing rate for the past program broadcast in accordance with the schedule form the center device, a number of requests for the past program, and information based on the viewing rate and the number of requests.

10. The program broadcasting method according to claim 9, wherein the information with regard to the program comprises information indicating allowance or rejection of transmitting the program, and the program broadcasting method further comprising:

transmitting viewing information with regard to the program received through the communication device from the terminal device to the center device, receiving the viewing information in the center device;

selecting allowance or rejection of transmitting the program on the basis of the viewing information in the center device;

erasing the program stored in the center device on the basis of the selection of allowance or the rejection of transmitting; and updating information indicating the selection of allowance or the rejection of transmitting on the basis of the selection of allowance or the rejection of transmitting in the center device, wherein the information indicating the selection of allowance or the rejection of transmitting is one indicating whether or not the center device stores the program at a transferable condition to the terminal device in accordance with a request.

11. The program broadcasting method according to claim 10, wherein the information with regard to the program includes the viewing information, and the image information for the program selection of a user includes a display on the basis of the viewing information.

12. The program broadcasting method according to claim 10, wherein the information with regard to the program includes information with regard to viewing frequency or request frequency as the statistical data, and the program broadcasting method further comprising of the processes of:
totaling the viewing information or the request signal of the program;
calculating the viewing frequency or the request frequency per program;
updating the viewing frequency or the request frequency on the basis of the calculated viewing frequency or calculated request frequency; and
selecting allowance or rejection of transmitting the program on the basis of the viewing frequency or the request frequency.

13. The program broadcasting method according to claim 10, further comprising of the process of transmitting the request signal of the program through the communication device to the center device on the basis of the information indicating allowance or rejection of transmitting the program, included in the information with regard to the program and transmitted by the center device.

14. The program broadcasting method according to claim 9, further comprising of the process of updating the information with regard to the program on the basis of a fact that the program is broadcast by the center device.

15. A program transmitting/receiving system, comprising:
a center station comprising a center control circuit and a memory; and
a plurality of terminal stations connected to the center station via a communication network,
wherein a first terminal station of the plurality of terminal stations comprises a first terminal control circuit,
wherein the center control circuit broadcasts a program, in accordance with a broadcast schedule, to the plurality of terminal stations via the communication network and stores the program in the memory,
wherein, if a user of the first terminal station selects the program after the center control circuit broadcasts the program, the first terminal control circuit sends a program request signal to the center station,
wherein the center control circuit reads the program from the memory in response to the program request signal and re-transmits the program to at least the first terminal,
wherein the center control circuit transmits an electronic program guide, which contains at least part of the broadcast schedule and which identifies the program based on at least a broadcast time of the program, to the first terminal station,
wherein the first terminal control circuit displays the electronic program guide in a two-dimensional way,
wherein the electronic program guide indicates whether or not the program has already been broadcast,
wherein the electronic program guide includes statistical data with regard to viewing of the program; and
wherein the statistical data with regard to viewing of the program comprises one of a viewing rate for the past program broadcast in accordance with the schedule from the center device, a number of requests for the past program, and information based on the viewing rate and the number of requests.

16. The system as claimed in claim 15, wherein the first terminal control circuit only transmits the program request signal for the program after the program has been broadcast.

17. The system as claimed in claim 15, when the electronic program guide indicates that the program has already been broadcast and the user selects the program, the first terminal control circuit sends the program request signal to the center station, and
wherein, when the electronic program guide indicates that the program has not been broadcast and the user selects the program, the first terminal control circuit does not send the program request signal to the center station.

18. The system as claimed in claim 17, when the electronic program guide indicates that the program is currently being broadcast and the user selects the program, the first terminal control circuit does not send the program request signal to the center station and tunes to a channel on which the program is being broadcast.

19. The system as claimed in claim 15, wherein a channel on which the program is broadcast from the center station in accordance with the broadcast schedule is different than a channel on which the program is re-transmitted in response to the program request signal.

20. A terminal station, comprising:
a display; and
a control circuit,
wherein the control circuit receives an electronic program guide that indicates past programs that have been broadcast from a center station in the past, identifies current programs that are currently being broadcast from the center station, and identifies future programs that will be broadcast from the center station in the future,
wherein the control circuit display the electronic program guide on the display in a two-dimensional way,
wherein, when a user selects a selected past program from one of the part programs identified in the electronic program guide, the control circuit outputs a request signal to the center station requesting the center station to re-transmit the selected past program to the terminal station,
wherein the electronic program guide also indicates statistical data with regard to viewing of the program; and
wherein the statistical data with regard to viewing of the program comprises one of a viewing rate for the past program broadcast in accordance with the schedule from the center device, a number of requests for the past program and information based on the viewing rate and the number of requests.

21. The terminal stations as claimed in claim 20, wherein, when the user selects a selected current program from one of the current programs from the electronic program guide, the control circuit does not output a request signal to the center station relating to the selected current program.

22. The terminal station as claimed in claim 21, wherein, when the user selects the selected current program the control circuit tunes to a channel on which the current program is being broadcast from the center station.

23. The system as claimed in claim 20, wherein a channel on which the selected past program is broadcast from the center station in accordance with the broadcast different than a channel on which the selected past program is re-transmitted in response to the request signal.

* * * * *